United States Patent
Dai et al.

(10) Patent No.: US 11,100,723 B2
(45) Date of Patent: Aug. 24, 2021

(54) SYSTEM, METHOD, AND TERMINAL DEVICE FOR CONTROLLING VIRTUAL IMAGE BY SELECTING USER INTERFACE ELEMENT

(71) Applicant: GUANGDONG VIRTUAL REALITY TECHNOLOGY CO., LTD., Guangzhou (CN)

(72) Inventors: Jingwen Dai, Guangzhou (CN); Jie He, Guangzhou (CN)

(73) Assignee: GUANGDONG VIRTUAL REALITY TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 16/731,097

(22) Filed: Dec. 31, 2019

(65) Prior Publication Data
US 2020/0211297 A1    Jul. 2, 2020

Related U.S. Application Data

(63) Continuation of application No. PCT/CN2019/122724, filed on Dec. 3, 2019.

(30) Foreign Application Priority Data

| Dec. 3, 2018 | (CN) | 201811468491.7 |
| Dec. 3, 2018 | (CN) | 201811476415.0 |
| Nov. 4, 2019 | (CN) | 201911066795.5 |

(51) Int. Cl.
*G06T 19/20* (2011.01)
*G06T 3/60* (2006.01)

(52) U.S. Cl.
CPC .......... *G06T 19/20* (2013.01); *G06T 3/60* (2013.01); *G06T 2200/24* (2013.01); *G06T 2219/2016* (2013.01)

(58) Field of Classification Search
None
See application file for complete search history.

(56) References Cited

U.S. PATENT DOCUMENTS

| 2017/0278262 A1* | 9/2017 | Kawamoto | G06F 3/012 |
| 2018/0004290 A1* | 1/2018 | Shtraym | G06F 3/017 |

(Continued)

FOREIGN PATENT DOCUMENTS

| CN | 106933360 A | 7/2017 |
| CN | 106997235 A | 8/2017 |

(Continued)

OTHER PUBLICATIONS

International Search Report, International Application No. PCT/CN2019/122724, dated Feb. 24, 2020 (3 pages).

*Primary Examiner* — YuJang Tswei

(57) ABSTRACT

The present application provides a method of controlling a virtual image. The method may includes acquiring relative spatial position between a terminal device and an interaction device; generating the virtual image based on the relative spatial position, wherein the virtual image includes one or more user interface elements, and a superimposing position of each user interface element in a real space correspond to the interaction device; generating in advance and acquiring a rotational vector corresponding to the interaction device, determining a spatial position of the rotational vector in a virtual space based on the relative spatial position, wherein a direction indicated by the rotational vector may be fixed; and when the spatial position is located with a region corresponding to any user interface element in the virtual space, performing a corresponded control operation based on the user interface element corresponding to the region.

20 Claims, 16 Drawing Sheets

(56) References Cited

U.S. PATENT DOCUMENTS

| | | | |
|---|---|---|---|
| 2018/0025531 A1* | 1/2018 | Terahata | G06T 15/20 345/421 |
| 2018/0275837 A1 | 9/2018 | Getz et al. | |

FOREIGN PATENT DOCUMENTS

| | | | |
|---|---|---|---|
| CN | 108062159 A | 5/2018 | |
| CN | 108304075 A | 7/2018 | |
| CN | 108646997 A | 10/2018 | |

\* cited by examiner

SYSTEM, METHOD, AND TERMINAL DEVICE FOR CONTROLLING VIRTUAL IMAGE BY SELECTING USER INTERFACE ELEMENT

CROSS REFERENCE TO RELATED APPLICATIONS

The present application is a continuation-application of International (PCT) Patent Application No. PCT/CN2019/122724 filed on Dec. 3, 2019, which claims foreign priorities of Chinese Patent Application No. 201811468491.7, filed on Dec. 3, 2018, Chinese Patent Application No. 201811476415.0, filed on Dec. 3, 2018, and Chinese Patent Application No. 201911066795.5, filed on Nov. 4, 2019, the entire contents of which are hereby incorporated by reference.

TECHNICAL FIELD

The present disclosure generally relates to the technical field of computers, and in particular to a system, a method, and a terminal device for controlling a virtual image by selecting a user interface element.

BACKGROUND

As technology advances and living standards improve, augmented reality (AR) has become a research focus and has appeared in people's daily lives. In the field of the AR, some interaction devices are typically used to display and control a virtual image. Some methods of controlling the virtual image may require a user to rotate the user's head frequently or to perform other complicated operations to control various types of content shown in the virtual image, causing inconvenience.

SUMMARY OF THE DISCLOSURE

The present disclosure may provide a method of controlling a virtual image, a terminal device, and a non-transitory storage medium.

According to a first aspect, a system of controlling a virtual image is provided and includes a terminal device and an interaction device. The interaction device may include at least one faces. The terminal device may include a processor and a non-transitory memory. The non-transitory memory may have at least one program stored in, and the at least one program may be executed by the processor to perform operations of: acquiring a relative spatial position between the terminal device and an interaction device; generating a virtual image based on the relative spatial position, wherein the virtual image includes at least one user interface element, and a superimposing position of the at least one user interface element in a real space corresponds to the at least one face of the interaction device; acquiring a rotation vector, which is generated in advance and corresponds to the interaction device, and determining a spatial position of the rotation vector in a virtual space based on the relative spatial position, wherein a direction indicated by the rotation vector is fixed; and, when the spatial position is in a position region corresponding to any user interface element in the virtual space, executing a corresponded control operation based on the user interface element corresponding to the position region.

According to a second aspect, a method of controlling a virtual image is provided and includes: acquiring a relative spatial position between the terminal device and an interaction device; generating a virtual image based on the relative spatial position, wherein the virtual image includes at least one user interface element, and a superimposing position of the at least one user interface element in a real space corresponds to the interaction device; acquiring a rotation vector, which is generated in advance and corresponds to the interaction device, and determining a spatial position of the rotation vector in a virtual space based on the relative spatial position, wherein a direction indicated by the rotation vector is fixed; and, when the spatial position is in a position region corresponding to any user interface element in the virtual space, executing a corresponded control operation based on the user interface element corresponding to the position region.

According to a third aspect, a terminal device includes one or more processors and a non-transitory memory. The non-transitory memory has one or more computer program stored in. The one or more computer program are arranged to be executed by the one or more processors to perform the above-mentioned method.

DETAILED DESCRIPTION

Figure 1:
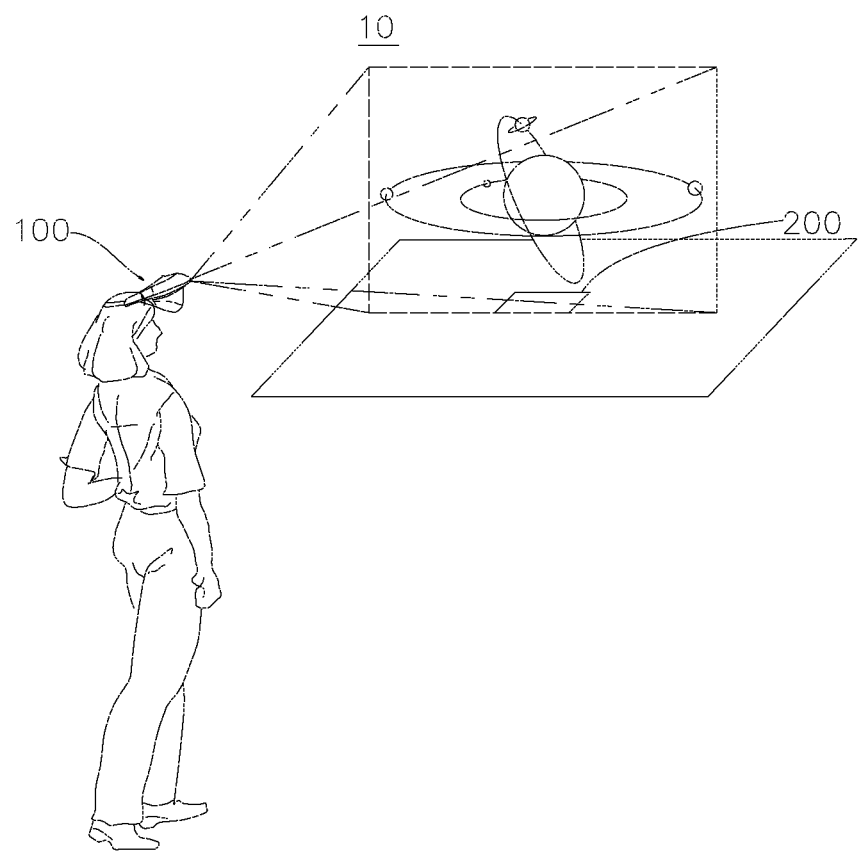
FIG. 1 is an application scenario of an augmented reality system according to an embodiment of the present disclosure.

As shown in FIG. 1, an embodiment of the present disclosure provides an augmented reality system 10, including a terminal device 100 and at least one marker 200. The terminal device 100 may be a head mounted display, the head mounted display may be an integrated head mounted display or a head mounted display connected with an exterior electronic apparatus. The terminal device 100 may further be a smart terminal, such as a mobile phone, exteriorly connected to or plugged into a head mounted display, that is the terminal device 100 may be a processor or a storage of the head mounted display, such that the head mounted display may display the virtual object.

Figure 2:
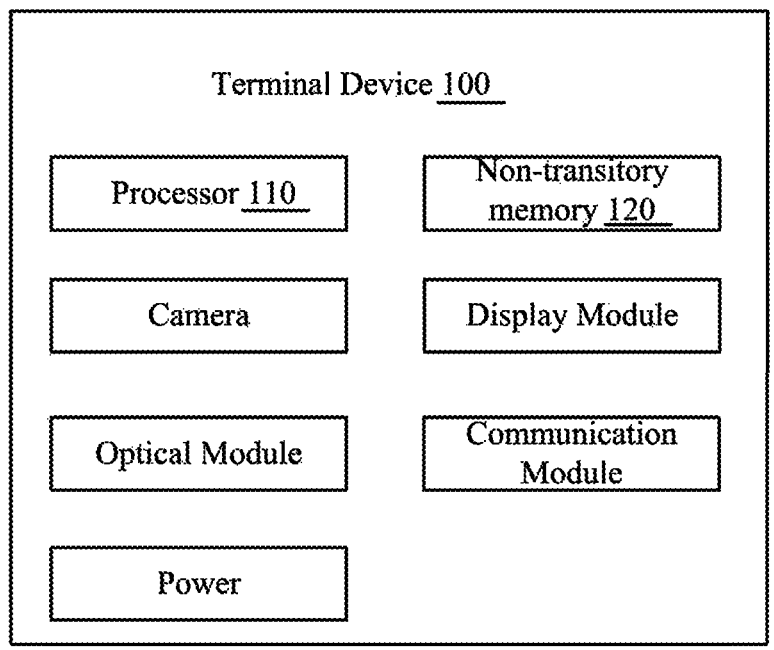
FIG. 2 is a structural diagram of a terminal device according to an embodiment of the present disclosure.

As shown in FIG. 2, the terminal device 100 may include a processor 110 and a non-transitory memory 120. The non-transitory memory 120 may have one or more programs stored in, and the one or more programs may be executed by one or more processors 110 to perform the method as described in the present disclosure. The processor 110 may include one or more processing cores. The processor 110 may use various interfaces and lines to connect various portions in the electronic device 100. By running or executing an instruction, a program, a code set, or an instruction set which may be stored in the non-transitory memory 120, and by invoking data stored in the non-transitory memory 120, various kinds of functions of the electronic device 100 may be performed, and data may be processed. The processor 110 may be realized in at least one form of hardware including a digital signal processor (DSP), a field-programmable gate array (FPGA), and a programmable gate array (PLA). The processor 110 may integrate at least one of a central processing unit (CPU), a graphics processing unit (GPU), a modem, and the like, or a combination thereof. The CPU may substantially handle an operating system, a user interface, applications, and the like. The GPU may be arranged to render and draw displayed content. The modem may be arranged to handle with wireless communication. The modem may be realized in a form of a communication chip independently, instead of being integrated into the processor 110. The non-transitory memory 120 may include a random access memory or a read-only memory. The non-transitory memory 120 may be configured to store an instruction, a program, a code, a code set, or an instruction set. The non-transitory memory 120 may include a program storage area and a data storage area. The program storage area may store an instruction to implement an operating system, an instruction to perform at least one function (such as a touch, an audio display function, an image display function, and the like), an instruction to perform various methods as described in embodiments hereafter, and the like. The data storage area may store data generated during usage of the terminal device 100.

In some embodiments, the terminal device 100 may further include a camera to capture images of a real object and target scene. The camera may be an infrared camera or a visible light camera, which is not limited in the present disclosure.

In some embodiments, the terminal device 100 may include one or more of the following components: a display module, an optical module, a communication module, and a power. The display module may include a display control unit. The display control unit may be configured to receive a displayed image of virtual content rendered by a processor, and the displayed image may be displayed and projected to the optical module, such that a user may see a three-dimensional virtual content through the optical module. The display module may be a display screen, a projection apparatus, or the like which are configured to display images. The optical module may use an off-axis optical system or a waveguide optical system, and the displayed image displayed by the display module may be projected to eyes of the user through the optical module. In some implementations, the user may observe a real environment through optical module, having a visual effect of the virtual content superimposed onto the real environment. The communication module may be a Bluetooth, Wireless Fidelity (Wi-Fi), ZigBee, or other modules. The terminal device may communicate with and connect to an interactive device through the communication module to perform interaction of messages and instructions. The power may supply power to the entire terminal device, ensuring that all components of the terminal device may operate normally.

In some embodiments, a marker 200 may include a pattern having a recognizable feature. For example, the marker 200 may have a topological pattern with a connective relation between sub-markers and feature points. As an implementation, an infrared filter may be arranged to cover the marker 200. The marker 200 may be invisible to a user, and the camera may be an infrared camera. By emitting infrared light, an image of the marker may be captured, and an impact of visible light on the image of the marker may be reduced, improving accuracy of tracking.

When the marker 200 is located within a visual range of the camera, the terminal device 100 may capture an image containing the marker 200. The processor may obtain image information of the marker, recognize the marker 200 contained in the image, and obtain a relative position and pose relation between the marker 200 and the terminal device 100.

Figure 3:
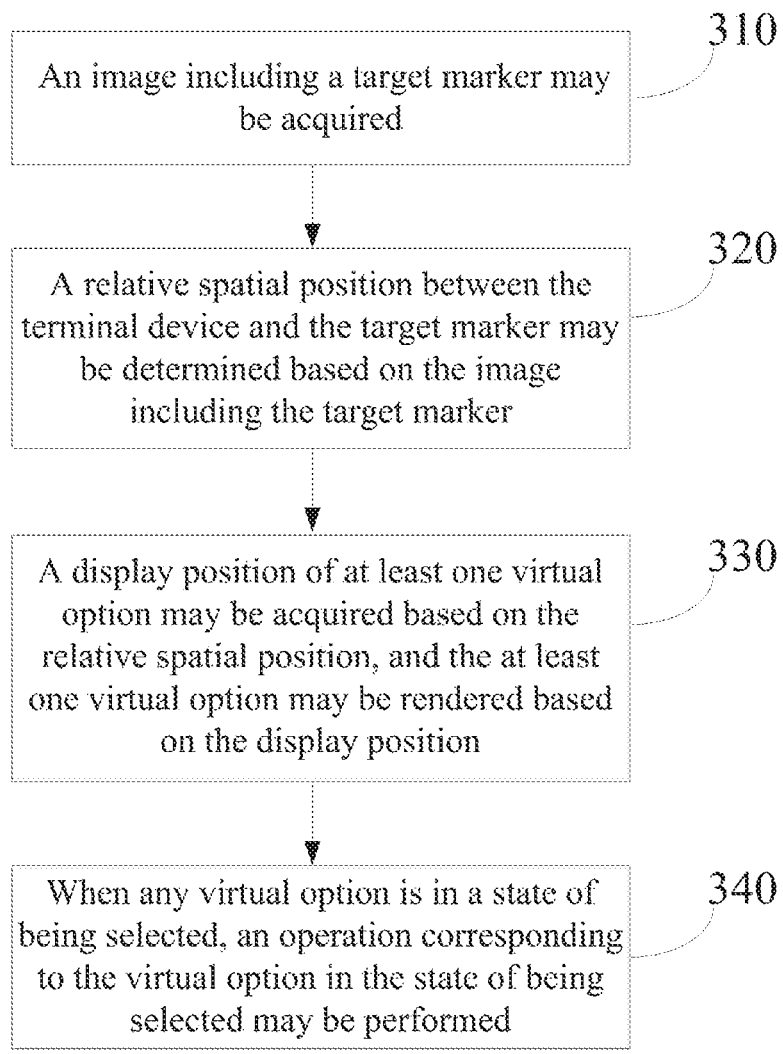
FIG. 3 is a flow chart of a method of displaying augmented reality according to an embodiment of the present disclosure.

As shown in FIG. 3, the present disclosure provides an augmented reality method of displaying a virtual option. The method may be executed by the terminal device and include following blocks.

At block 310, an image including a target marker may be acquired.

The camera of the terminal device may capture an image including a target marker, wherein the target marker is located within a visual range of the camera, and the image including the target marker may be acquired, such that a spatial position of the target marker may be determined. A user may use the terminal device to observe a virtual option superimposed onto a real scene. The virtual option may refer to virtual content provided for the user to perform selection, confirmation, or related operations. The virtual option may be shown in a form of a user interface control, such as a button, a list, a text box, a dialog box, or the like. Based on the user's operation performed to the virtual option, the terminal device may process data correspondingly to achieve the user's purpose. For example, in a scenario of ordering a meal, at least one virtual option may be provided, and each virtual option may be a name of a dish. When the operation is performed to the option, virtual content (such as a three-dimensional model of the dish) of the dish corresponding to the option may be displayed. In a scenario of selecting a song, at least one virtual option may be provided, and each virtual option may be a name of a song. When the operation is performed to the option, virtual content of the song corresponding to the option may be displayed, such as song information or a music video of the song. The above-mentioned scenarios are only some examples of the present disclosure and do not limit the present disclosure.

At block 320, a relative spatial position between the terminal device and the target marker may be determined based on the image including the target marker.

The terminal device may recognize the image including the target marker to determine the relative spatial position between the terminal device and the target marker and an identity of the target marker. The relative spatial position may include a position and pose of the terminal device relative to the target marker, and the pose may be an orientation and rotation angle of the target marker relative to the terminal device.

At block 330, a display position of at least one virtual option may be acquired based on the relative spatial position, and the at least one virtual option may be rendered based on the display position.

In some implementations, based on the relative spatial position between the target marker and the terminal device, the display position of the at least one virtual option may be determined, and the at least one virtual option may be rendered. The display position may be a position in a real space onto which the at least one virtual option is superimposed, and may be expressed by rendering coordinates of the at least one virtual option in a virtual space.

The terminal device may acquire the display position of the at least one virtual object based on a relative position relation between the at least one virtual option and the target marker and based on the relative spatial position between the terminal device and the target marker.

Specifically, the terminal device may acquire first spatial coordinates of the target marker in the real space, transform the first spatial coordinates into second spatial coordinates of the target marker in the virtual space, and calculate the rendering coordinates of the at least one virtual option in the virtual space based on the second spatial coordinates and the relative position relation between the at least one virtual option and the target marker, that is, the display position of virtual content may be acquired. The user may use the terminal device to observe the at least one virtual option superimposed onto the real space, and a relation between the virtual option and the target marker may meet the relative position relation.

At block 340, when any virtual option is in a state of being selected, an operation corresponding to the virtual option in the state of being selected may be performed.

In some implementations, the terminal device may detect a state of the virtual option, and when the virtual option is in the state of being selected, a corresponded operation may be performed. The state of being selected may be a state of the virtual option being selected or being operated. When the virtual option is in the state of being selected, the terminal device may perform the corresponded operation.

In an embodiment, the terminal device may detect whether the display position of the virtual option meets a predefined rule to determine whether the virtual option is in the state of being selected. Alternatively, when a selection operation is detected as being performed to the virtual option, the virtual option may be determined as being in the state of being selected. A way of determining whether the virtual option is in the state of being selected may not be limited in the present disclosure.

When any virtual option is detected to be in the state of being selected, the operation corresponding to the virtual option in the state of being selected may be performed. For example, when a virtual option of "checking dishes" is in the state of being selected, an operation of displaying the dishes may be performed; when a virtual option of "adding a product into a list" is in the state of being selected, an operation of adding the product into the list may be performed; and when a virtual option of "deleting a product from a list" is in the state of being selected, an operation of deleting the product from the list may be performed.

According to the above-mentioned augmented reality display method, the target marker may be recognized, and at least one virtual option corresponding to the target marker may be displayed. When any virtual option is in the state of being selected, the operation corresponding to the virtual option in the state of being selected may be performed. In such a way, a display effect of the virtual option may be improved, and interactivity may be improved.

Figure 4:
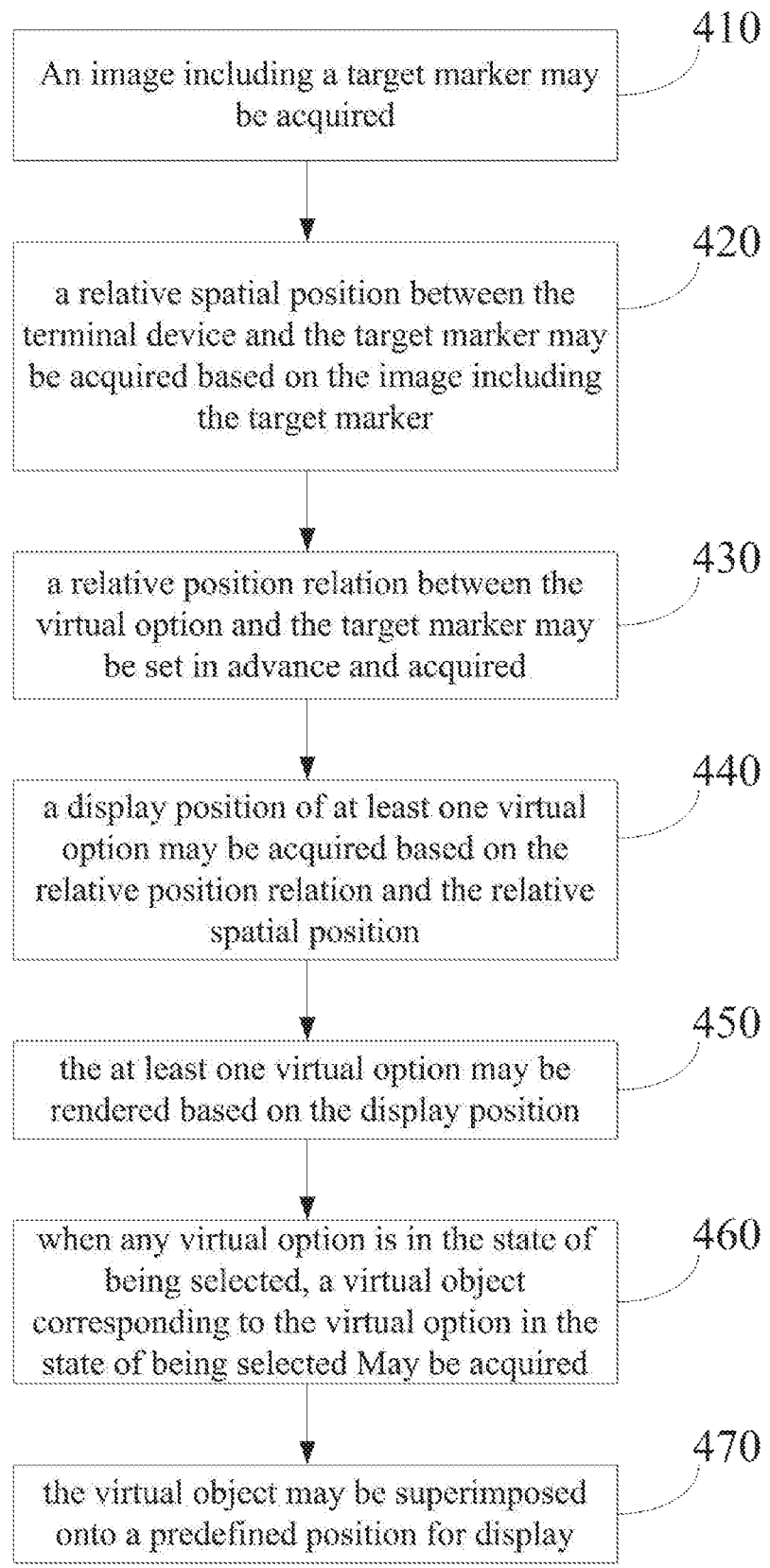
FIG. 4 is a flow chart of a method of displaying augmented reality according to another embodiment of the present disclosure.

As shown in FIG. 4, an augmented reality display method according to another embodiment of the present disclosure may be provided and executed by the terminal device. The method may include following blocks.

At block 410, an image including a target marker may be acquired.

At block 420, a relative spatial position between the terminal device and the target marker and an identity of the target marker may be determined based on the image including the target marker.

The terminal device may recognize the target marker in the image and determine the identity of the target marker. In some implementations, at least one virtual option corresponding to the identity may be obtained. Each target marker may have a unique identity, and each identity may correspond to at least one virtual option. Correspondence between the identity of the target marker and the virtual option may be stored in the terminal device in advance. The virtual option corresponding to the identity of the target marker may be obtained based on the correspondence.

In some implementations, various scenarios may be arranged. Various markers with various identities may correspond to the various scenarios. The virtual option of a corresponded scenario may be obtained based on the correspondence. For example, the various scenarios may include a scenario of ordering a meal, a scenario of selecting a song, a scenario of purchasing a product, a scenario of a game, a scenario of selecting a video, or the like. Various virtual options corresponding to the various scenarios may be displayed via the various markers. In the scenario of ordering a meal, the various virtual options may include options for various dishes and various drinks and an option for confirming selection. In the scenario of selecting a song, the various virtual options may include options for names of various songs and an option for confirming selection.

At block 430, a preset relative position relation between the virtual option and the target marker may be acquired.

The relative position relation between the virtual option and the target marker may be stored in the terminal device in advance. In some implementations, various virtual options may be superimposed onto various target markers according to a predefined arrangement, or displayed on edges or peripheries of the various target markers. The predefined arrangement may be a linear arrangement, a polygonal arrangement, or a curved arrangement, which is not limited herein.

In some embodiments, the various virtual options may be arranged on a same plane, such that display of the various virtual options may look tidy in the virtual space. The plane may be parallel or unparallel to a plane at which the various target markers are arranged.

At block 440, a display position of the at least one virtual option may be determined based on the relative position relation and the relative spatial position.

Taking the terminal device as a reference, first coordinates of the target marker in the real space may be transformed into second coordinates of the target marker in the virtual space. Rendering coordinates of the at least one virtual option may be determined based on the relative position relation between the virtual option and the target marker, that is, the display position may be determined.

At block 450, the at least one virtual option may be rendered based on the display position.

Figure 5:
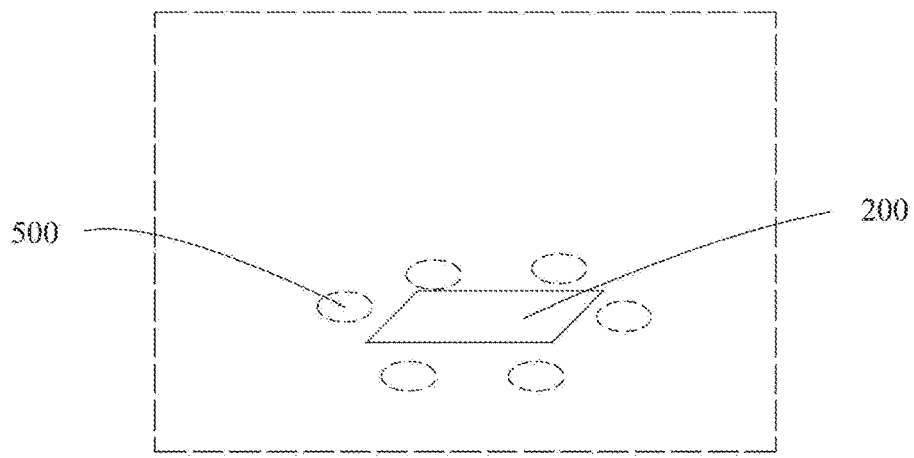
FIG. 5 is a view of a virtual option according to an embodiment of the present disclosure.
Figure 6:
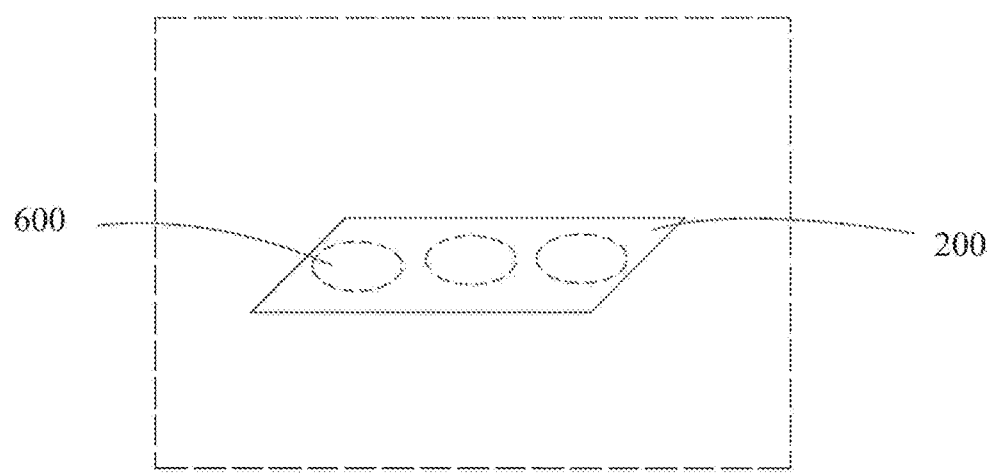
FIG. 6 is a view of a virtual option according to another embodiment of the present disclosure.

In some implementations, the at least one virtual option may be rendered and displayed based on data of the at least one virtual option and the rendering coordinates. The user may use the terminal device to observe the at least one virtual option superimposed onto the real space according to the predefined arrangement. For example, as shown in FIG. 5, virtual options 500 may be superimposed onto and displayed at a periphery of the target marker 200. Further, for example, as shown in FIG. 6, virtual options 600 are arranged along a straight line and superimposed on the target marker 200 in the real space.

Figure 7:
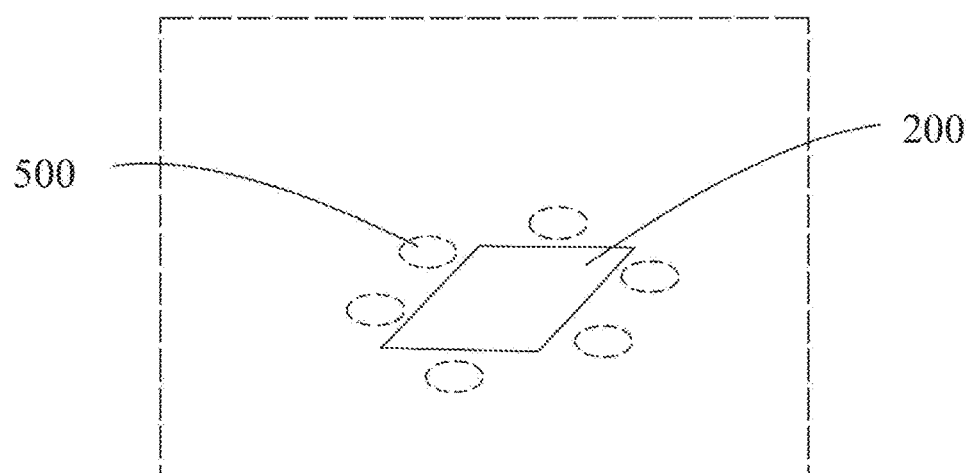
FIG. 7 is a view of the virtual option shown in FIG. 5.

In some implementations, the relative spatial position between the terminal device and the target marker may be changed to adjust the display position of the virtual option. For example, the target marker 200 shown in FIG. 5 may be rotated to reach a position as shown in FIG. 7, and the virtual options may be moved as the target marker 200 being rotated.

At block 460, when any virtual option is in the state of being selected, a virtual object corresponding to the virtual option in the state of being selected may be acquired.

In some embodiments, a virtual option may be selected when the virtual option is within a predefined display range, when a selection operation corresponds to the virtual option is acquired, and/or when a distance between the display position of the virtual option and the terminal device is smaller than a predefined distance.

Figure 8:
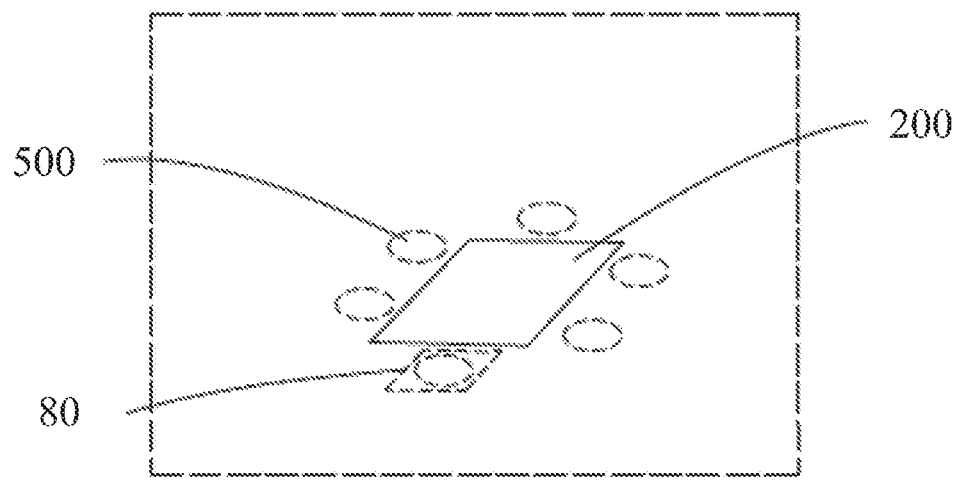
FIG. 8 is a view of the virtual option shown in FIG. 7 being selected.

In an implementation, the terminal device may detect whether the virtual option is arranged in the predefined display range. When the virtual option is detected to be arranged in the predefined display range, the terminal device may determine that the virtual option is in the state of being selected. Specifically, a coordinate region in the virtual space corresponding to the predefined display range may be set in advance, when the rendering coordinates of the virtual option is within the coordinate region, the virtual option may be determined to be in the state of being selected. As shown in FIG. 8, the virtual options 500 may be within the predefined display range 80, and may be in the state of being selected.

The terminal device may adjust the display position of the virtual option to allow the virtual option to be arranged within the predefined display range, such that the virtual option may be in the state of being selected. As an implementation, the display position of the virtual option may be modified by adjusting relative position and pose of the target marker, such as rotating the target marker, or by adjusting relative position and pose of the terminal device. As another implementation, the display position of the virtual option may be adjusted via a controller.

In an implementation, the terminal device may detect whether the selection operation is performed to the virtual option. When the selection operation performed to the virtual option is detected, the virtual option may be determined as being in the state of being selected. The selection operation may be triggered by the controller connected to the terminal device. The user may perform operations on the controller to allow the terminal device to generate a selection instruction to select the virtual option. The controller may be a handle or a mobile device having a touch screen. The terminal device may obtain the selection operation by recognizing a motion of the user.

In an implementation, the terminal device may detect whether the distance between the display position of the virtual option and the terminal device is smaller than the predefined distance. The virtual option corresponding to a distance away from the terminal device smaller than the predefined distance may be determined as being in the state of being selected. Specifically, the display position of the virtual option may be adjusted, such that the distance between the display position of the virtual option and the terminal device may be smaller than the predefined distance, and the virtual option may be selected.

In some embodiments, the virtual option in the state of being selected may be displayed by a predefined mean, such as by improving brightness of the selected virtual option, zooming in the selected virtual option, changing a color of the selected virtual option, displaying an arrow pointing towards the selected virtual option, and the like, such that the user may easily recognize the selected virtual option.

In some implementations, when any virtual option is detected as being in the state of being selected, the virtual object corresponding to the virtual option in the state of being selected may be displayed. In various scenarios, each virtual option may correspond to a unique virtual object. For example, in a scenario of ordering a meal, each virtual option corresponding to each dish may be included, and the virtual object corresponding to each virtual option of each dish may include a model of each dish and basic information of each dish. In a scenario of selecting a song, each virtual option corresponding to each song may be included, and the virtual object corresponding to each virtual option of each song may include a music video and information of each song.

At block 470, the virtual object may be displayed and superimposed onto a predefined position.

Figure 9:
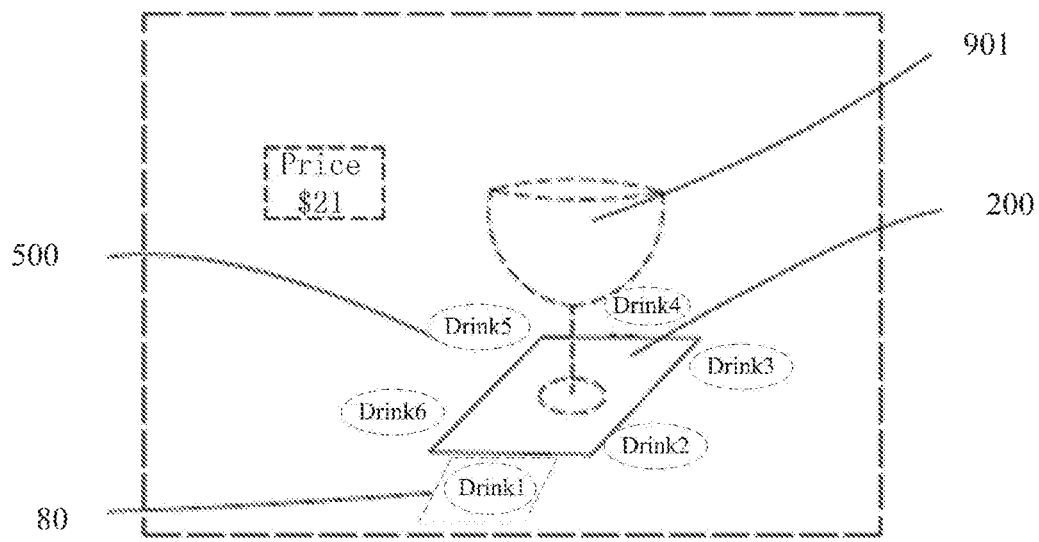
FIG. 9 is a view of a virtual object of the selected virtual option shown in FIG. 8.

The predefined position may be a position overlapped with a region of the target marker. For example, the predefined position may be overlapped with a central position of the target marker or an edge of the target marker. The user may know information corresponding to the selected virtual option easily, as shown in FIG. 9, the virtual object 901 corresponding to the selected virtual option may a drink 1, and a price for the drink 1 may be displayed. The user may use the terminal device to observe the virtual object corresponding to the virtual option superimposed onto the real space, and may visualize detailed information of the virtual option.

Figure 10:
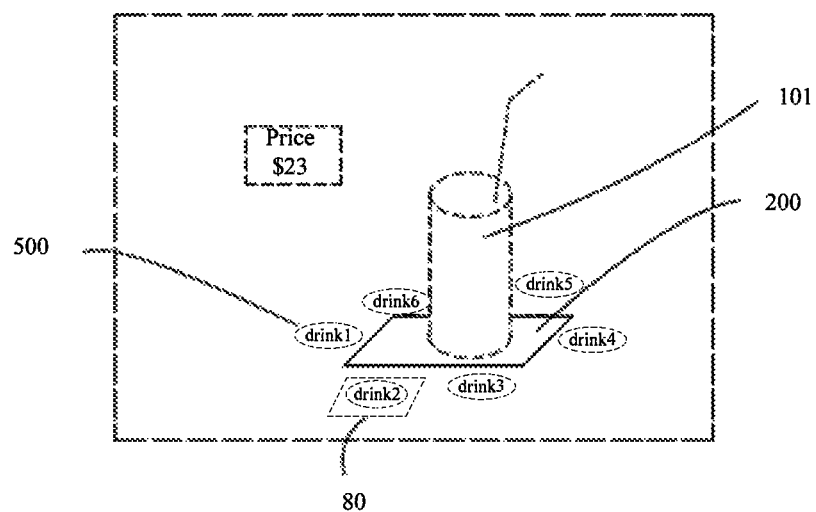
FIG. 10 is a view of a virtual object of another selected virtual option.

In some implementations, the terminal device may update the displayed virtual object based on a change of the virtual option in the state of being selected, that is, the virtual option in the state of being selected is changed from a first virtual option to a second virtual option. When the change of the virtual option in the state of being selected is detected (i.e., the second virtual option is detected to be in the state of being selected at present), the virtual object corresponding to the second virtual option may be acquired and displayed to replace the virtual object corresponding to the first virtual option. For example, in a scenario of ordering a meal, the virtual option in the state of being selected may be changed from a virtual option of dish 1 into a virtual option of dish 2, the virtual object corresponding to the dish 1 may be changed into the virtual object corresponding to the dish 2. As shown in FIG. 9 and FIG. 10, when the virtual option 500 in the state of being selected is changed, the displayed virtual object may be changed from a drink 1 to a drink 2. An easy position adjustment may be performed to achieve switching between different virtual objects corresponding to different virtual options. The user may visualize detailed information of each virtual option directly and quickly.

In some implementations, corresponded processing may be performed based on an operation corresponding to the selected virtual option. When the operation performed to the selected virtual option, data of the virtual option in the state of being selected may be added into a selection list, and the data included in the selection list may be sent to other devices. In some scenarios, the user may perform a related operation to the virtual option in the state of being selected to select the data corresponding to the virtual option. Specifically, an addition operation performed to the virtual option in the state of being selected may be detected, and the addition operation may allow the data of the virtual option to be added into the selection list. For example, in a scenario of ordering a meal, the data of dishes corresponding to the selected virtual option may be added into the selection list and sent to a server, and the dishes may be ordered. In a scenario of selecting a song, data of a song corresponding to the selected virtual option in the state of being selected may be added into the selection list and sent to the server, and corresponded audio data may be acquired from the server.

According to the above-mentioned method of displaying augmented reality, the data of the virtual option may be send to another device based on the operation performed to the virtual option in the state of being selected, such that the another device may process the data of the virtual option to meet various demands of various scenarios.

Figure 11:
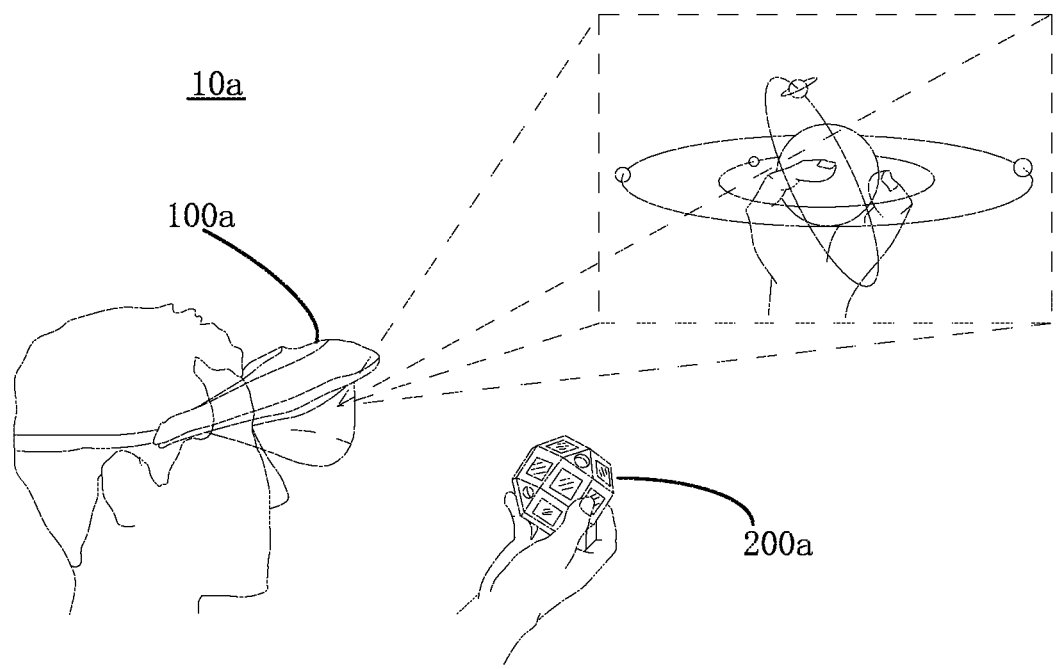
FIG. 11 is a scenario of a display system of augmented reality according to another embodiment of the present disclosure.

As shown in FIG. 11, an augmented reality display system 10a according to an embodiment of the present disclosure is provided. The display system includes a terminal device 100a and an interaction device 200a. In some implementations, the interaction device 200a may be a polyhedron having a plurality of faces able to be marked. At least two of the plurality of faces are arranged on different planes, and each of the at least two of the plurality of faces is arranged with a marker. The present disclosure does not limit a shape and a structure of the interaction device 200a. The interaction device 200a may be a polyhedron having at least one flat face and at least one curved face, or a polyhedron having curved faces only. The structure of the interaction device 200a may be a pyramid, a prism, a frustum of a pyramid, a polyhedron, or a sphere, or a combination thereof. The sphere may be regarded as the polyhedron having innumerable faces.

The terminal device 100a may recognize the marker of the interaction device 200a within a visual range of the terminal device, to obtain an identity of the marker and a spatial position of the marker relative to the terminal device 100a, such as a relative position and pose. The terminal device 100a may display correspond virtual content based on the relative spatial position of the interaction device 200a.

In some implementations, the marker may be a topological pattern. In some implementations, the marker may be a light spot, the terminal device may track the light spot to obtain the relative spatial position.

Figure 12:
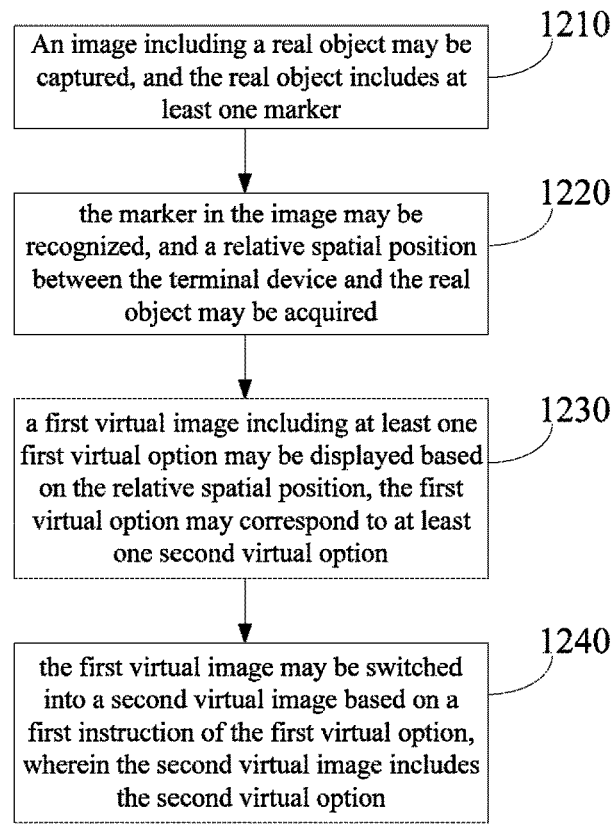
FIG. 12 is a flow chart of a method of displaying a virtual content according to an embodiment of the present disclosure.

As shown in FIG. 12, the present disclosure provides a method of displaying virtual content. The method may be applied to a terminal device and includes following blocks.

At block 1210, an image including at least one marker of an interaction device may be captured.

In some implementations, the interaction device includes at least two markers arranged on at least two faces on different planes. As an implementation, the interaction device may be a polyhedron, such as a hexahedron or a 26-face polyhedron. The polyhedron includes various faces able to be marked, and at least two faces are arranged on different planes and arranged with different markers. The user may rotate the interaction device to change the pose of the interaction device relative to the terminal device, such that the terminal device may capture an image including at least one marker of the interaction device.

At block 1220, the marker in the image may be recognized, and a relative spatial position between the terminal device and the interaction device may be calculated.

The terminal device may recognize the marker in the captured image and calculate the relative spatial position between the terminal device and the interaction device. The relative spatial position includes a relative position and relative pose. The terminal device may obtain a spatial position of the terminal device relative to the interaction device based on a physical position of the marker on the interaction device, wherein the physical position is stored in the terminal device in advance.

In some implementations, a plurality of markers are included in the captured image, and the spatial position of each marker relative to the terminal device may be obtained. The spatial position of the terminal device relative to the interaction device may be obtained based on a relation between each marker.

In some embodiments, the terminal device may recognize an identity of the marker to obtain at least one virtual option corresponding to the identity. Correspondence between the identity of the marker and the virtual option may be stored in the terminal device in advance.

In some embodiments, various markers may correspond to various virtual options under a same scenario. For example, in a scenario of a virtual zoo, a marker 1 may correspond to a dolphin, and a marker 2 may correspond to an octopus. A same marker may correspond to different virtual options in different scenarios. For example, in a scenario of a virtual game, the marker 1 may correspond to an option for downloading the game, and the marker 2 may correspond to an option for a game video. In a scenario of shopping, the marker 1 may correspond to an option for tops, and the marker 2 may correspond to an option for casual pants. Different markers may correspond to different virtual options at different levels. For example, in a level of game categories, the marker 1 may correspond to an option for a link game, and the marker 2 may correspond to an option for Tank War. In a level of the link game, the marker 1 may correspond to an option for introduction of the link game, and the marker 2 may correspond to an option for downloading the link game.

In some implementations, the terminal device may store various applications for various scenarios, such as applications of scenarios of shopping, gaming, reading news, having entertainment, receiving education, or the like, such that the virtual options of the various scenarios may be displayed.

At block 1230, a first virtual image including at least one first virtual option may be displayed based on the relative spatial position, and the first virtual option may correspond to at least one second virtual option.

In one scenario, multiple levels may be arranged, and at least one virtual option may be set in each level. The first virtual option may be any option in any level. For example, in a scenario of a virtual game, a first level of the multiple levels may be game categories, including a category of shooting games and a category of puzzle games, a second level of the multi-level options may be game applications, including Gobang and Tank War. The first virtual option may be an option for a category of games in the first level or may be an option for a game application in the second level.

In some implementations, after the spatial position of the terminal device relative to the interaction device is obtained, the first virtual image may be rendered and displayed in the virtual space. The first virtual image may include one or more first virtual options of a same level.

The terminal device may obtain first spatial coordinates of the interaction device in the real space based on the relative spatial position and transform the first spatial coordinates into second spatial coordinates in the virtual space. Based on the second spatial coordinates and a predefined position relation between each first virtual option to be displayed and a real object, rendering coordinates of each first virtual option in the virtual space may be obtained, such that the first virtual image including each first virtual option may be generated.

The terminal device may acquire data of the first virtual option to be displayed, and generate the first virtual option based on the data of the first virtual option and the rendering coordinates. Modeling data of the first virtual option may be used to generate a model of three-dimensional virtual content, such as data of colors, data of vertexes, data of contours, and the like. The modeling data of the first virtual option may be stored in the terminal device in advance, may be downloaded from the server, or may be acquired from other terminals.

Figure 13:
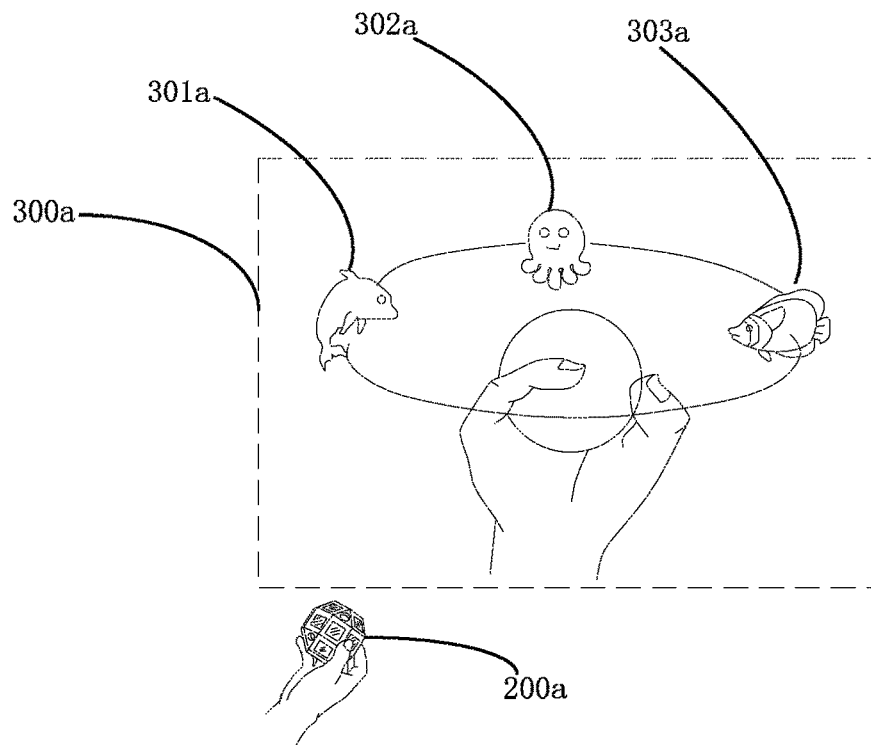
FIG. 13 is a scenario of displaying a virtual content according to an embodiment of the present disclosure.

The user may use the terminal device to observe the first virtual image superimposed on the real space, wherein the first virtual image includes the at least one first virtual option. As shown in FIG. 13, the user may wear a head-mounted display to recognize marker of the interaction device 200*a*, and observe the first virtual image 300*a* superimposed on the real space. The first virtual image 300*a* includes a plurality of first virtual options, such as a dolphin 301*a*, an octopus 302*a*, and a goldfish 303*a*.

In some implementations, the first virtual image may further include a scene image corresponding to the first virtual option. For example, the first virtual option may be a virtual jellyfish, and the scene image may be a virtual ocean. The displayed first virtual image may be the virtual jellyfish swimming in the virtual ocean.

In some implementations, the terminal device may display the first virtual option by one or more of means of: controlling the first virtual option to be displayed in a predefined static state; controlling the first virtual option to be displayed in a predefined dynamic state; controlling the first virtual option to be displayed as a three-dimensional model, controlling the first virtual option to be zoomed in or zoomed out; and controlling the first virtual option to be displayed at a predefined position.

A display position of each first virtual option may correspond to each of the various faces of the interaction device. For example, a displayed panda may correspond to one of the various faces of the interaction device, and a displayed monkey may correspond to another one of the various faces of the interaction device. A plurality of first virtual options may be uniformly arranged and displayed at a periphery of the interaction device.

The second virtual option may be any option in any level of the multiple levels, and the second virtual option and the first virtual option may be arranged in different levels. In one embodiment, the second virtual option and the first virtual option may be arranged in adjacent levels. The second virtual option may be arranged in a parent level of the first virtual option (one level upper to the level of the first virtual option), or arranged in a sub-level of the first virtual option (one level lower from the level of the first virtual option). The first virtual option may correspond to at least one second virtual options. When a plurality of second virtual options are available, the plurality of second virtual options are in a same level. Each first virtual option may correspond to different second virtual options, and the plurality of second virtual option corresponding to the first virtual option may be acquired based on correspondence between first virtual option and the second virtual option stored in advance.

As an implementation, the second virtual option may be arranged in a sub-level of the first virtual option. For example, the first virtual option may be a marine life park, and corresponded second virtual options may be one or more virtual marine animals, such as a virtual jellyfish and a virtual whale.

As an implementation, the first virtual option may be arranged in a sub-level of the second virtual option. Corresponded second virtual options include one second virtual option being a parent option of at least one first virtual option. For example, the at least one first virtual option may be in a level of animals of the marine life park, and the at least one first virtual option may correspond to a virtual jellyfish and a virtual whale. At least one second virtual option may be in a level of regions of the a virtual zoo, the at least one second virtual option may include a region for birds, a region for pandas, and the marine life park, and the marine life park may be the parent option of the at least one first virtual option.

At block 1240, the first virtual image may be switched into a second virtual image based on a first instruction for the first virtual option, wherein the second virtual image includes the second virtual option.

The user may switch between virtual options among the multiple levels, such that the first virtual image displayed at present may be switched into a virtual image of an upper level or a lower level. The terminal device may receive a selection operation performed to the first virtual option, and obtain the first instruction for the first virtual option, such that the displayed first virtual image may be switched into the second virtual image, and the second virtual image may include the second virtual option corresponding to the first virtual option.

In one embodiment, the first instruction may be an instruction for entering the lower level. The terminal device may determine the first virtual option being selected, and display one or more options of the lower level of the first virtual option. For example, the first virtual option may be a zoo, various park options of the zoo may be displayed based on the first instruction, such as a marine life park, a region for birds, and the like.

In one embodiment, the first instruction may be an instruction for entering the upper level. The terminal device may acquire the parent option corresponding to the first virtual option based on the first instruction, and display one or more options in the upper level. For example, the first virtual option may be pandas, and the option in the upper level may be a panda house. Options of a level, which the panda house belongs to, may be displayed, such as the panda house, an aquarium, a penguin house, and the like.

Figure 14:
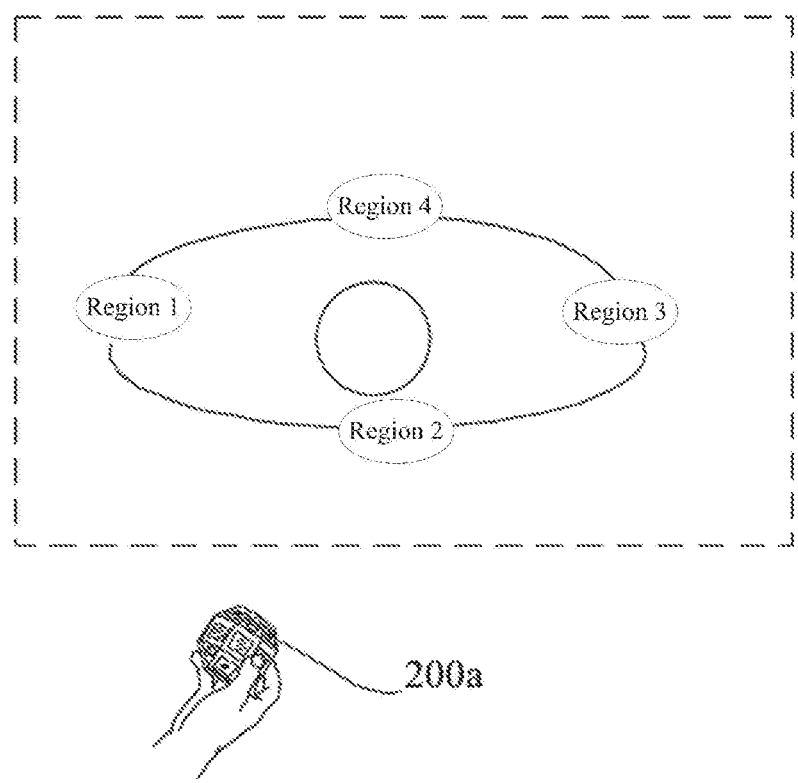
FIG. 14 is a scene related to the virtual content shown in FIG. 13.

As shown in FIG. 13 and FIG. 14, in a scenario of the virtual zoo, various regions of the virtual zoo may be displayed in FIG. 14, and various virtual animals of a certain region may be displayed in FIG. 13. When content shown in FIG. 14 is the first virtual image displayed at present, and when the terminal device receives the first instruction for entering the lower level, the virtual image shown in FIG. 14 may be switched into the virtual image shown in FIG. 13. When content shown in FIG. 13 is the first virtual image displayed at present, and when the terminal device receives the first instruction for entering the upper level, the virtual image shown in FIG. 13 may be switched in to the virtual image shown in FIG. 14.

As an implementation, the first instruction may be generated by collecting the user's operation performed on the interaction device. The interaction device may include at least one operation region. The operation region may include at least one of a touch screen and a button. In some implementations, the user's operation performed on the interaction device may include, but not limited to, a single-finger sliding, a clicking, a pressing, and a multi-finger sliding performed in the operation region, such that the virtual image may be controlled to be switched.

As another implementation, the terminal device may generate the first instruction may by recognizing the user's gesture.

In one embodiment, during the second virtual image being displayed, the terminal device may play an audio correspondingly. For example, the displayed second virtual option may be a bird, and the terminal device may play an audio of chirping of the bird.

Figure 15A:
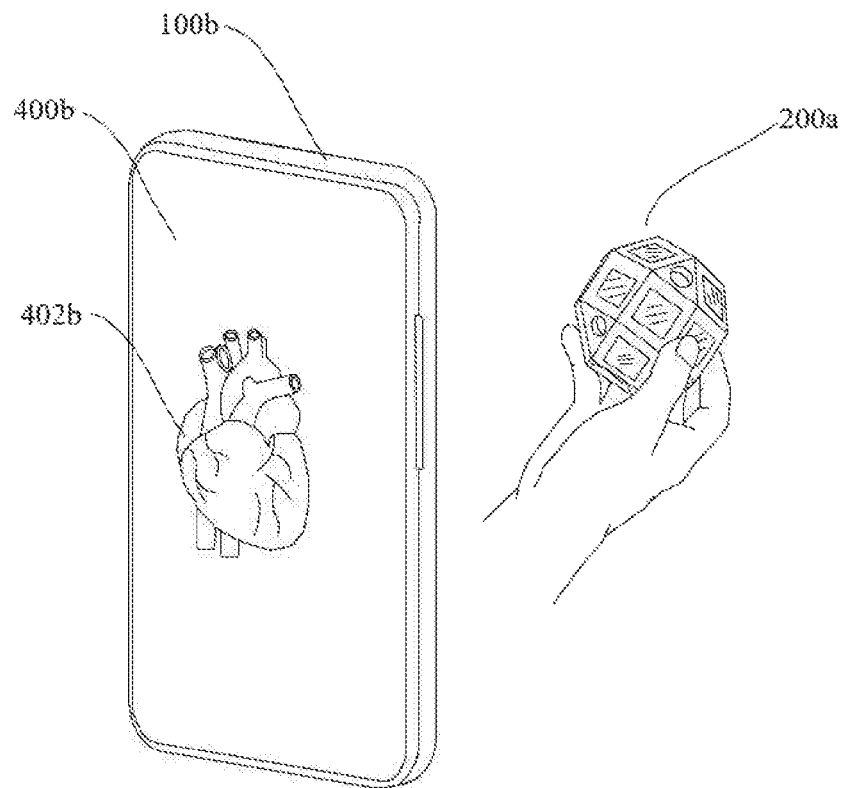
FIGS. 15a and 15b are scenes of displaying virtual contents according to another embodiment of the present disclosure.
Figure 15B:
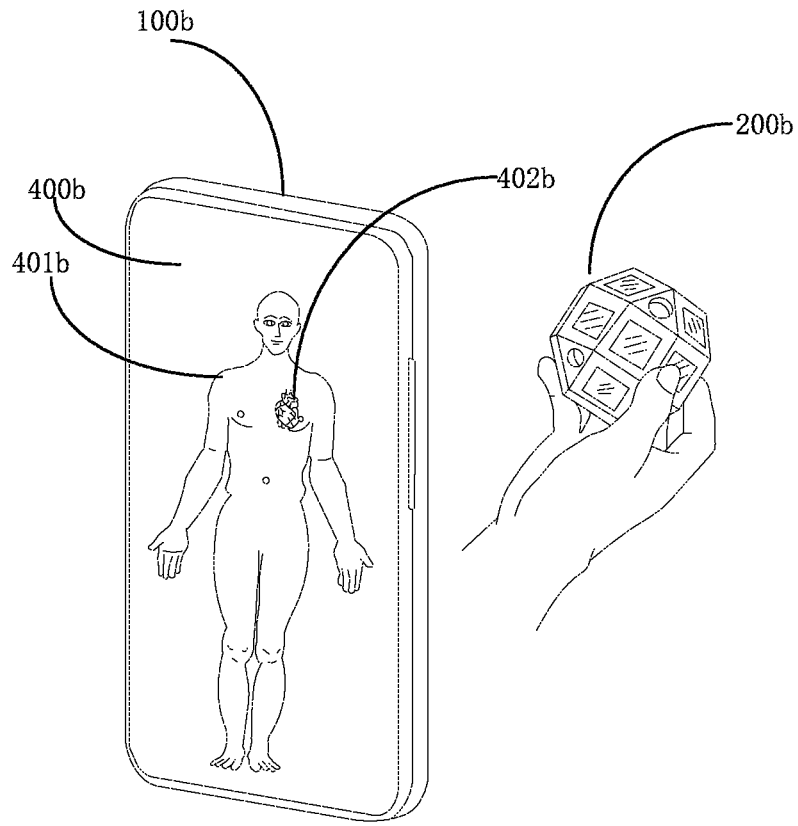

In some implementations, the second virtual image may include the first virtual option. As shown in FIG. 15a, in a scenario of medicine, the user may use a mobile device 100b to observe the second virtual image 400b including a model of a heart 402b only. As shown in FIG. 15b, the user may use the mobile device 100b to observe the second virtual image 400b including a medical mannequin 401b and the model of the heart 402b. The medical mannequin 401b may be the first virtual option, and the model of the heart 402b may be the second virtual option.

Figure 16:
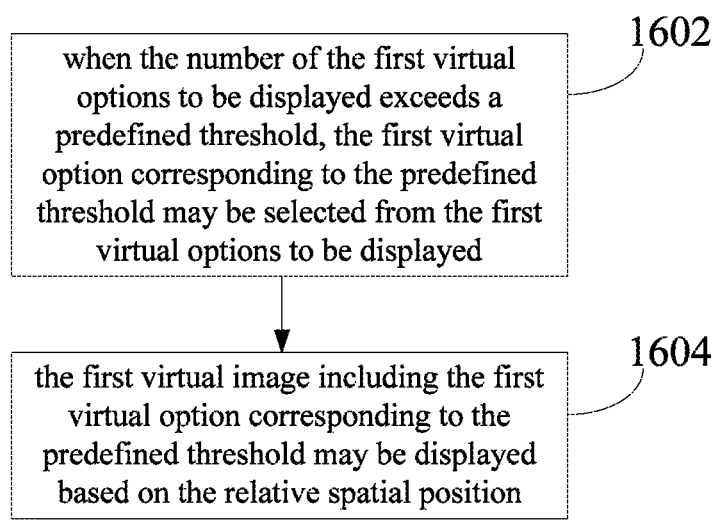
FIG. 16 is a flow chart of an operation 1230 shown in FIG. 12.

In some embodiments, when a large number of first virtual options are required to be displayed, limitation may be performed to the large number of first virtual options to be displayed. As shown in FIG. 16, the block 1230 may further include following blocks.

At block 1602, when the number of the first virtual options to be displayed exceeds a predefined threshold, the first virtual options corresponding to the predefined threshold may be selected from all first virtual options to be displayed.

The terminal device may determine whether the number of the first virtual options to be displayed is greater than the predefined threshold to further determine whether the terminal device may display entirety of all information of the first virtual options. The predefined threshold may be the greatest number of the first virtual options capable of being displayed by the terminal device, and may be stored in the terminal device in advance and determined according to the user's demand and actual needs. The greater the predefined threshold, the smaller the size of the displayed first virtual option.

When the number of the first virtual options required to be displayed exceeds the predefined threshold, the first virtual option corresponding to the predefined threshold may be selected from the first virtual options required to be displayed, and the first virtual image including the selected first virtual option may be displayed. When the number of the first virtual options required to be displayed is determined to be smaller than or equal to the predefined threshold, all of the first virtual options may be displayed.

For example, the predefined threshold may be 2. When an option of pandas is the only option required to be displayed, the terminal device may determine the number of the first virtual options required to be displayed as being smaller than the predefined threshold, and the option of pandas may be displayed directly. When the first virtual options required to be displayed include the option of pandas, an option of monkeys, and an option of tigers, the terminal device may determine the number of the first virtual options required to be displayed as being greater than the predefined threshold, any two of the first virtual options required to be displayed may be displayed, for example, the option of pandas and the option of monkeys may be displayed.

In some embodiments, the first virtual option may be selected based on a priority of the first virtual option. The priority may be a priority of importance, a priority of a frequency of being selected, a priority of the user's preference, and the like.

In some embodiments, the first virtual option may be selected based on updating time of the first virtual option, the first virtual option having a latest updating time may be selected with the priority.

At block 1604, the first virtual image including the first virtual option corresponding to the predefined threshold may be displayed based on the relative spatial position.

The terminal device may select the first virtual option corresponding to the predefined threshold, and display the first virtual image including the selected first virtual option based on the relative spatial position between the terminal device and the interaction device.

In some embodiments, when the terminal device detects a switching instruction, at least one of the first virtual options displayed at present may be switched into at least one of unselected first virtual options. For example, in a scenario of a virtual game, the first virtual image may include an option of a link game and an option of Sokoban. When the terminal device detects the switching instruction, the option of the link game may be switched into an option of Snake, and the first virtual image may include the option of Sokoban and the option of Snake.

In some embodiments, the terminal device may switch all of the first virtual options displayed at present into other first virtual options. As an implementation, the first virtual options required to be displayed may be divided into groups, and the number of the first virtual options in each group may be equal to the predefined threshold. When the switching instruction is detected, a group of first virtual options displayed at present may be switched into another group of first virtual options. For example, in a scenario of a virtual game, the predefined threshold may be 2, the first virtual options required to be displayed may include an option of a link game, an option of Sokoban, an option of Snake, and an option of Tank War. The terminal device may display the option of the link game and the option of Sokoban at present, and when the switching instruction is detected, the first virtual options displayed at present may be switched into the option of Snake and the option of Tank War.

In some implementations, the terminal device may detect whether a change of a spatial position of the interaction device meets a predefined change. When the predefined change is met, the switching instruction may be generated. The change of the spatial position may include a change of an orientation and rotation angle of the interaction device relative to the terminal device, and the spatial position of the interaction device may be changed by rotating the interaction device. The predefined change may be a range of the change of the spatial position of the interaction device, and may be stored in the terminal device in advance and set based on actual demands. In some implementations, the predefined change may be a range of a change of the rotation angle, such as the rotational angel greater than 90°, or may be a change of a rotational direction, such as rotating to a right or rotating to a left.

Figure 17:
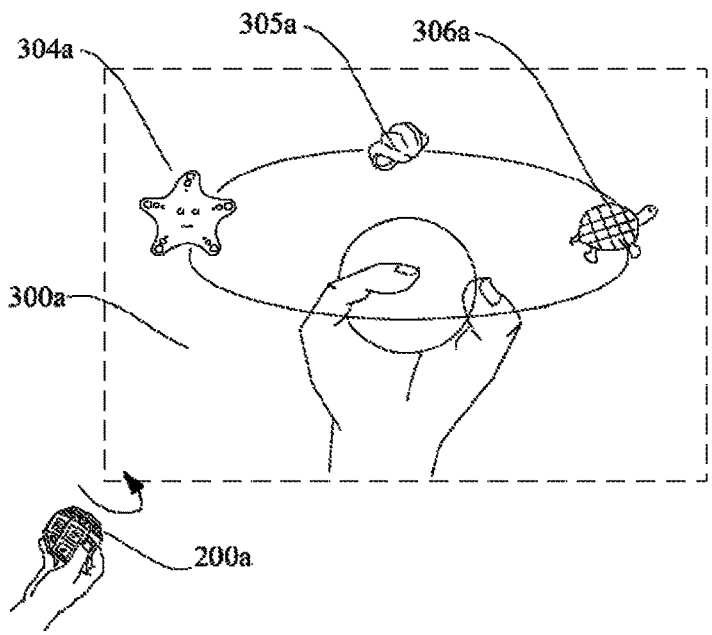
FIG. 17 is a scene related to the virtual content shown in FIG. 13.
Figure 18:
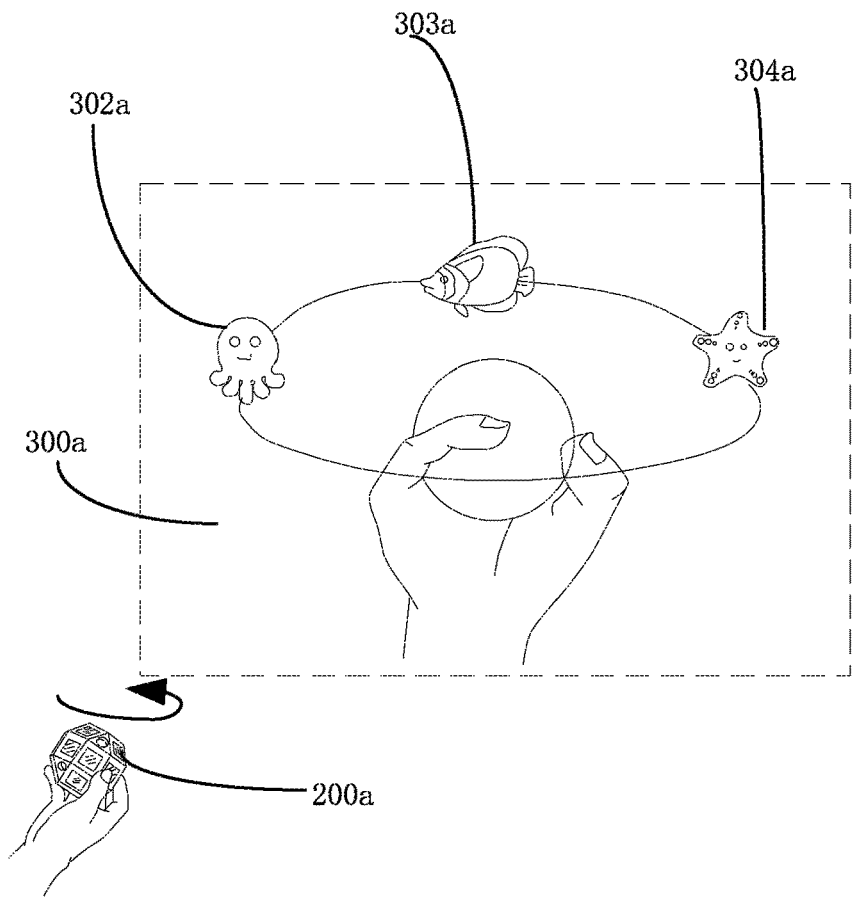
FIG. 18 is a scene related to the virtual content shown in FIG. 13.

As shown in FIG. 13 and FIG. 17, the user may rotate the interaction device 200a to the right. The dolphin 301a, the octopus 302a, and the goldfish 303a displayed in the FIG. 13 may be switched into a starfish 304a, a conch 305a, and a turtle 306a as shown in FIG. 17. Further as shown in FIG. 13 and FIG. 18, the user may rotate the interaction device 200a to the right and observe the dolphin 301a, the octopus 302a, and the goldfish 303a displayed at present being switched into the octopus 302a, the goldfish 303a, and the starfish 304a as shown in FIG. 18.

In some implementations, the terminal device may detect the user's operation performed in the operation region of the interaction device, such as a pressing, a single-finger sliding, and the like, and may confirm that the switching instruction is detected.

Figure 19:
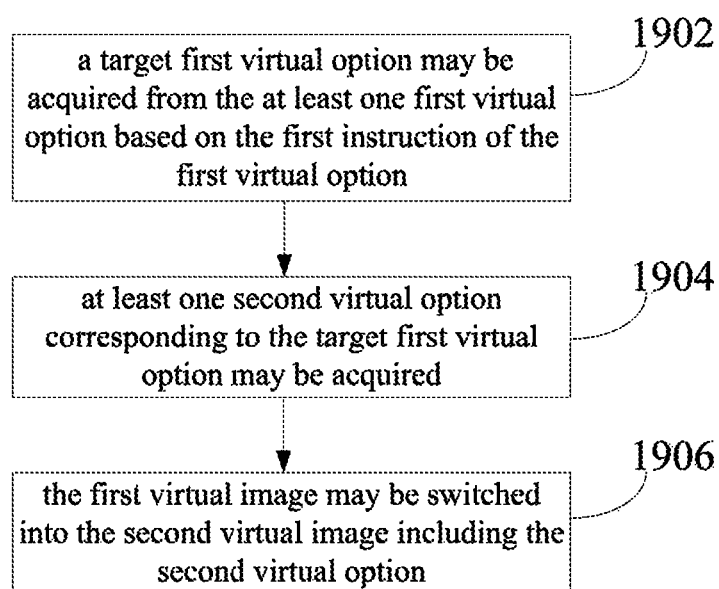
FIG. 19 is a flow chart of an operation 1240 shown in FIG. 12.

In some embodiments, as shown in FIG. 19, the block 1240 may include following blocks.

At block 1902, a target first virtual option may be acquired from the at least one first virtual option based on the first instruction for the first virtual option.

The terminal device may determine the target first virtual option based on the first instruction and display the second virtual option correspondingly. As an implementation, the first virtual option in the state of being selected may be acquired. When the first instruction is received, the first virtual option in the state of being selected may be the target first virtual option.

At block 1904, at least one second virtual option corresponding to the target first virtual option may be acquired.

At block 1906, the first virtual image may be switched into the second virtual image including the second virtual option.

The terminal device may acquire the at least one second virtual option corresponding to the target first virtual option and display the acquired second virtual option. As an implementation, the second virtual option may be displayed according to a predefined status at a predefined position following a predefined arrangement.

In some embodiments, the terminal device may receive a second instruction for the second virtual option to switch the second virtual image displayed at present into the first virtual image, such that virtual options of adjacent levels may be switched at will. As an implementation, before the terminal device switches the first virtual image into the second virtual image, the first virtual image may be stored. In such a way, after the second virtual image is displayed, and when the second virtual image is required to be switched in to the first virtual image, the first virtual image may be exported and displayed directly without acquiring data of the first virtual image repeatedly.

According to the embodiments of the present disclosure, the number of levels included in the multiple levels may not be limited, such as two levels, three levels, and five levels may be arranged. The above-mentioned first virtual option and the second virtual option may not specifically indicate an option in a particular level. The virtual option displayed at present may be determined as the first virtual option, and the virtual option to be switched and displayed may be determined as the second virtual option.

Figure 20:
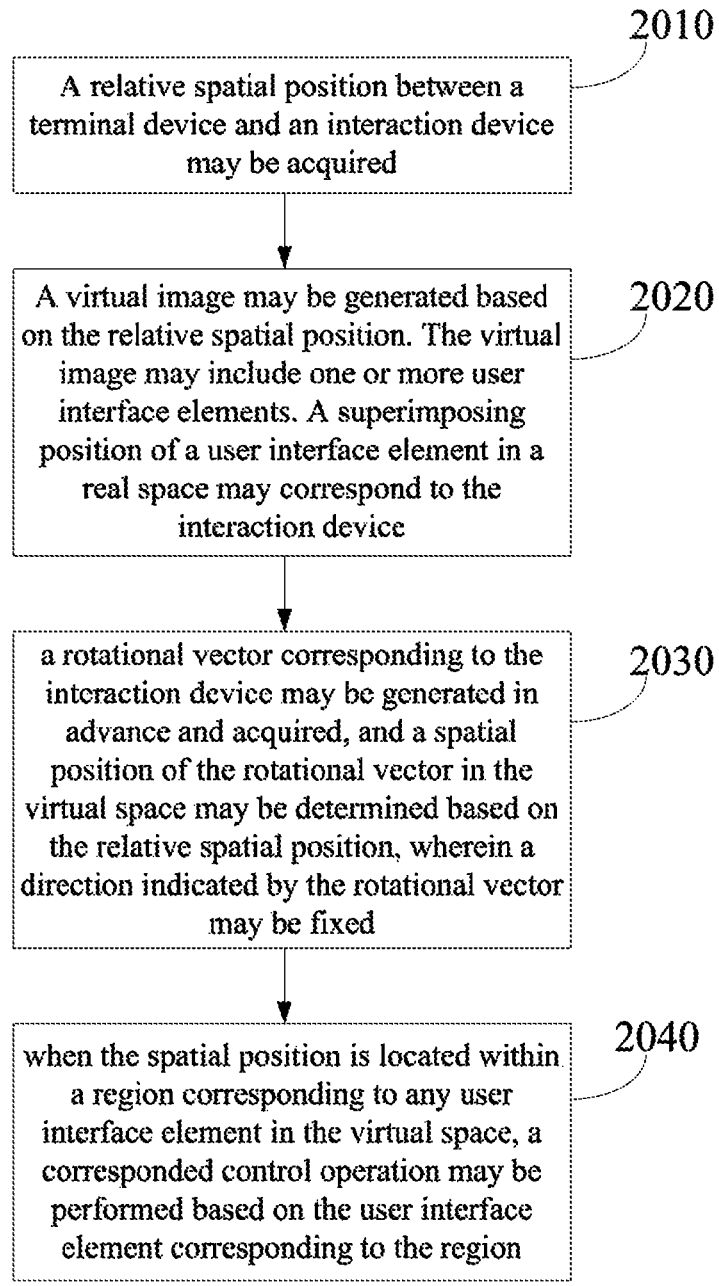
FIG. 20 is a flow chart of a method of controlling a virtual image according to an embodiment of the present disclosure.

As shown in FIG. 20, the present disclosure further provides a method of controlling a virtual image. The method may be applied to a terminal device, and include following blocks.

At block 2010, a relative spatial position between a terminal device and an interaction device may be acquired.

At block 2020, a virtual image may be generated based on the relative spatial position. The virtual image may include at least one user interface element. A superimposing position of the user interface element in a real space may correspond to the interaction device.

In some embodiments, the terminal device may acquire data of a three-dimensional model of the virtual image. The terminal device may acquire spatial position coordinates of the superimposing position of the virtual image in the real space based on the relative spatial position, and transform the spatial position coordinates into spatial coordinates in the virtual space. Rendering coordinates of the virtual image may be acquired, and the virtual image may be rendered. The rendering coordinates may refer to three-dimensional spatial coordinates of the virtual image in the virtual space taking a predefined point as a predefined origin (such as an origin of a world coordinate system, a point of a virtual camera as the predefined origin, and the like).

As an implementation, the virtual image may include one or more user interface elements to achieve interaction demands, and the user interface elements may include a window, a dialog box, a menu, a scrollbar, a graphical option, and the like.

In some embodiments, the superimposing region of the user interface element may be a surface of the interaction device or a position having a certain distance away from the surface of the interaction device. In one implementation, the virtual image may include a plurality of user interface elements, and the superimposing position of each of the plurality of user interface elements may correspond to a unique position of the interaction device. For example, when the interaction device is a polyhedron, superimposing positions of the plurality of user interface elements may be various faces of the polyhedron.

In some embodiments, after the terminal device generates the virtual image, the virtual image may be displayed. To be specific, after the terminal device renders the virtual image, display data of the virtual image may be acquired. The display data may include a red-green-blue (RGB) value of each pixel and coordinates of each pixel of the displayed image. The terminal device may generate the virtual image based on the display data, and the user may use the terminal device to observe the virtual image superimposed onto and displayed at the superimposing position corresponding to the interaction device.

At block 2030, a rotational vector corresponding to the interaction device may be generated in advance and acquired, and a spatial position of the rotational vector in the virtual space may be determined based on the relative spatial position, and a direction indicated by the rotational vector may be fixed.

In some implementations, the rotational vector corresponding to a position and pose of the interaction device may be generated in advance, and the rotational vector may be arranged to select virtual content. The direction indicated by the rotational vector may be predefined and fixed. As an implementation, the direction indicated by the rotational vector in the virtual space may be fixed in a first spatial coordinate system, wherein the first spatial coordinate system takes the terminal device as the origin. In other words, in the first spatial coordinate system, the direction indicated by the rotational vector corresponding to the interaction device may be fixed relative to the terminal device, and the direction indicated by the rotational vector may not be changed as the interaction device rotates. For example, in the spatial coordinate system taking the terminal device as the origin, the direction indicated by the rotational vector may originate from a center of the interaction device pointing towards a center of lens of the terminal device at all times. The direction indicated by the rotational vector may be set according to actual demands.

In some implementations, the terminal device may determine a spatial position of the rotational vector in a second spatial coordinate system taking the interaction device as an origin based on the pose of the interaction device. As the direction indicated by the rotational vector in the first spatial coordinate system may be fixed, when the pose of the interaction device is changed, a spatial position of the rotational vector in the second spatial coordinate system may be changed correspondingly. The superimposing position of the user interface element in the real space may correspond to the interaction device, the position of the user interface element in the second spatial coordinate system may not be changed, and therefore, interaction between the rotational vector and various user interface elements may be controlled by changing the position and/or the pose of the interaction device relative to the interaction device.

At block 2040, when the spatial position of the rotational vector is located within a position region corresponding to any user interface element in the virtual space, a corresponded control operation may be performed based on the user interface element corresponding to the position region.

In some implementation, when the position and/or the pose of the interaction device relative to the terminal device is changed, the terminal device may determine whether the spatial position of the rotational vector is located within the position region corresponding to any user interface element in the virtual space, based on the spatial position of the rotational vector in the second spatial coordinate system of the virtual space and based on a position of the user interface element in the second spatial coordinate system of the virtual space. When the spatial position of the rotational vector is determined to be located within the position region corresponding to any user interface element, the user interface element corresponding to the position region may be determined to be selected to achieve interaction with the selected user interface element. The terminal device may perform the corresponded control operation based on the selected user interface element. The control operation may include controlling the user interface element to be in a state of being selected, displaying virtual content corresponding to the user interface element, moving the user interface element, adjusting a display status of the user interface element, or the like.

The user may rotate the interaction device to allow the rotational vector corresponding to the interaction device to be located within various position regions corresponding to various user interface elements, such that interaction with the various user interface elements may be achieved easily.

Figure 21:
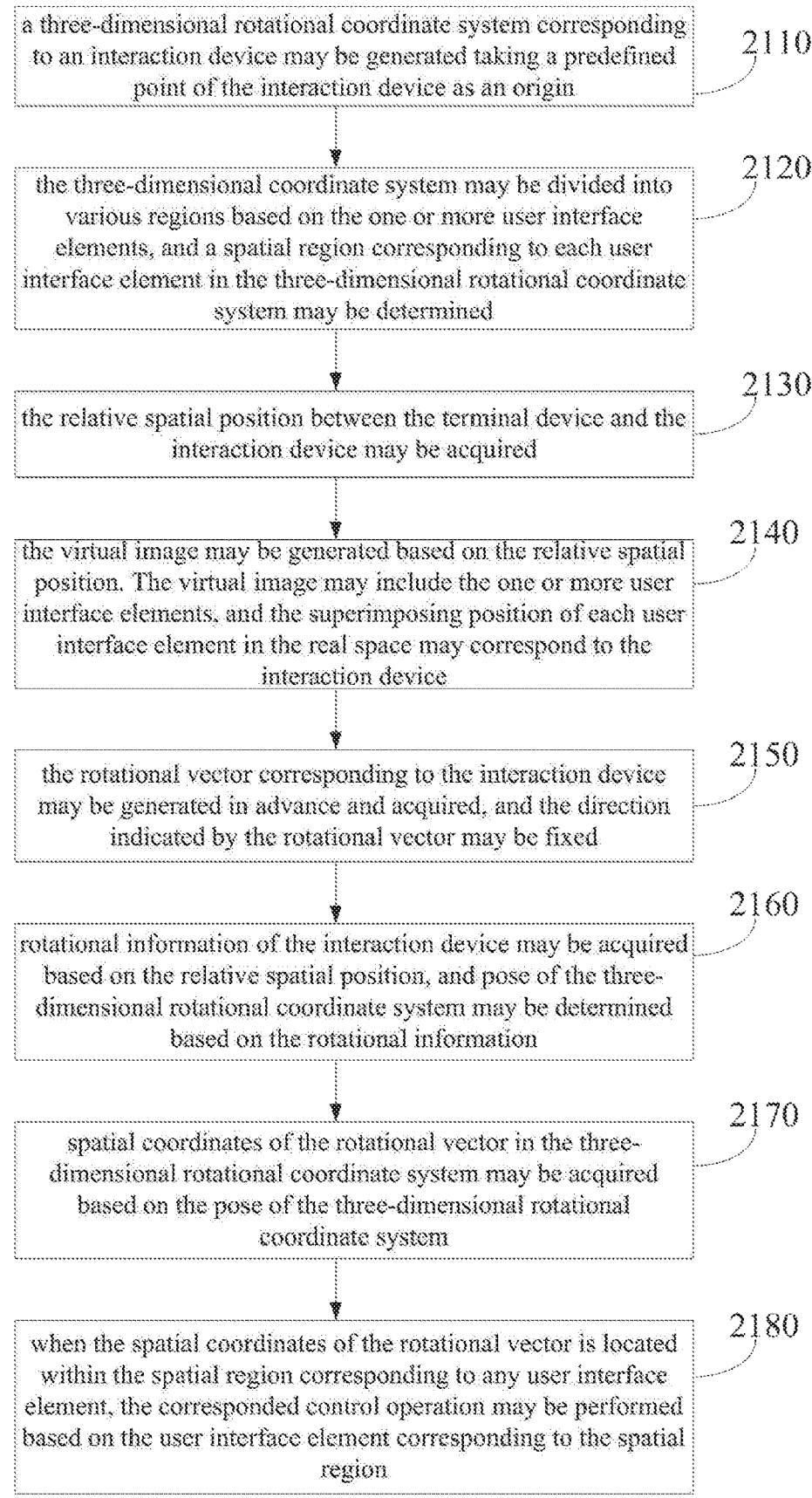
FIG. 21 is a flow chart of a method of controlling a virtual image according to another embodiment of the present disclosure.

As shown in FIG. 21, a method of controlling a virtual image according to another embodiment of the present disclosure may be provided and applied to a terminal device. The method may include following blocks.

At block 2110, a three-dimensional rotational coordinate system corresponding to an interaction device may be generated by taking a predefined point of the interaction device as an origin.

In the virtual space, the terminal device may generate the three-dimensional rotational coordinate system corresponding to the interaction device in advance taking the predefined point of the interaction device as the origin, that is, a second spatial coordinate system may be generated. The predefined point may be any point of the interaction device, and the predefined point may be for instance any vertex of the interaction device or a central point of the interaction device.

Figure 22:
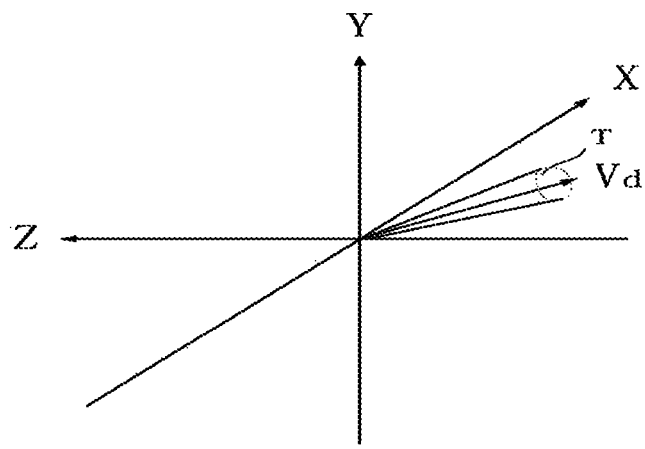
FIG. 22 is a rotated three-dimensional coordinate system according to an embodiment of the present disclosure.

As shown in FIG. 22, any point of the interaction device, such as the central point, may be set to be the origin. An axis along a vertical direction may be a Y-axis, a plane defined by an X-axis and a Z-axis may be a horizontal plane, and the three-dimensional rotational coordinate system may be generated. The X-axis and the Z-axis may be determined by following operations. A facing direction of the terminal device relative to the interaction device may be determined based on a relative spatial position between the terminal device and the interaction device, and the facing direction may be set as a direction indicated by a first vector. A component of the first vector on the horizontal place may be set to be the Z-axis, and a position of the X-axis may be determined based on a left-handed coordinate system. As the Y-axis is along the vertical direction, theY-axis may be determined based on the origin.

In some implementations, the three-dimensional rotational coordinate system corresponding to the interaction device may be an angular coordinate system, an Euler angle, an angle, or the like may be used to express a position of a point in the three-dimensional rotational coordinate system.

At block 2120, the three-dimensional coordinate system may be divided into various regions based on the one or more user interface elements, and a spatial region corresponding to each user interface element in the three-dimensional rotational coordinate system may be determined.

In some implementations, the terminal device may acquire the user interface element to be displayed, divide the three-dimensional rotational coordinate system into various regions based on the user interface element to be displayed, and determine the spatial region corresponding to each user interface element in the three-dimensional rotational coordinate system.

In some implementations, the terminal device may divide the three-dimensional rotational coordinate system into various regions based on the superimposing position of the user interface element in the real space corresponding to the interaction device. Each user interface element corresponds to a spatial region. A size of the spatial region corresponding to the user interface element may be equal to or different from a size of the user interface element. For example, the size of the spatial region corresponding to the user interface element may be greater than the size of the user interface element.

Figure 23:
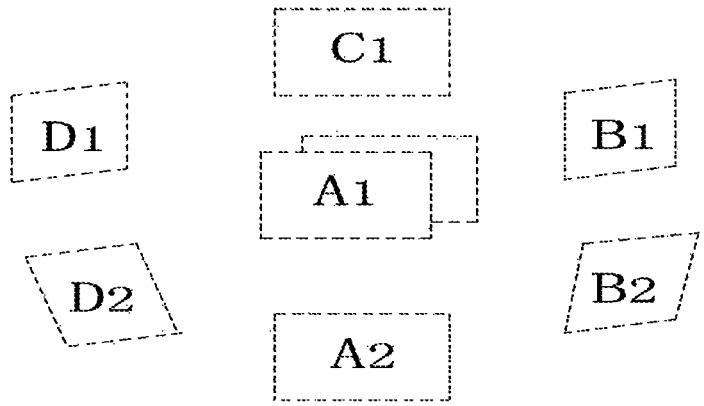
FIG. 23 is a view of a display effect according to an embodiment of the present disclosure.
Figure 24:
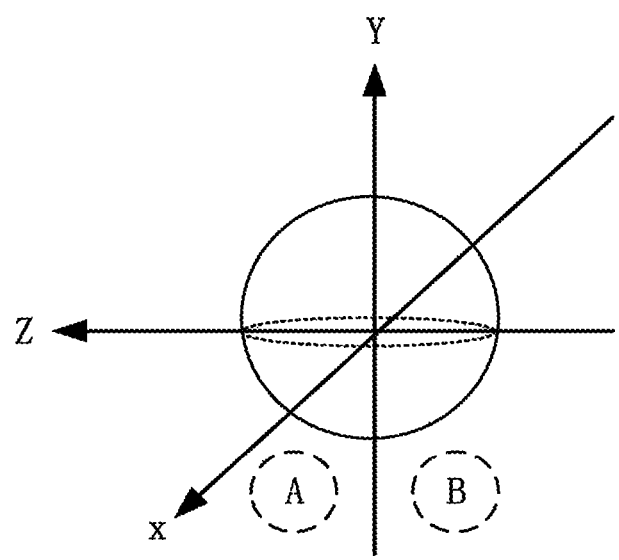
FIG. 24 is a view of another display effect according to an embodiment of the present disclosure.

In some implementations, the one or more user interface elements may be arranged into a single row, a single column, or multiple rows with multiple columns (in a form of a grid). The terminal device may divide the three-dimensional rotational coordinate system into various regions based on the arrangement of the one or more user interface elements. The terminal device may acquire the arrangement of the one or more user interface elements. As shown in FIG. 23, the one or more user interface elements may be arranged in the form of a grid, and the three-dimensional rotational coordinate system may be divided into various spatial regions by multiple rows with multiple columns. The terminal device may determine a spatial region corresponding to each user interface element based on an arrangement position of each user interface element. Further as shown in FIG. 24, the one or more user interface elements may be arranged into a single row or a single column, a plane at which the one or more user interface elements are arranged may be divided into various planar regions. The terminal device may determine a planar region corresponding to each arrangement position based on the arrangement position of each user interface element. The planar region may subsequently be mapped into the rotational coordinate system, and the spatial region corresponding to each user interface element in the three-dimensional rotational coordinate system may be obtained.

At block 2130, the relative spatial position between the terminal device and the interaction device may be acquired.

At block 2140, the virtual image may be generated based on the relative spatial position. The virtual image may include the one or more user interface elements, and the superimposing position of each user interface element in the real space may correspond to the interaction device.

At block 2150, the rotational vector corresponding to the interaction device may be generated in advance and acquired, and the direction indicated by the rotational vector may be fixed.

At block 2160, rotational information of the interaction device may be acquired based on the relative spatial position, and pose of the three-dimensional rotational coordinate system may be determined based on the rotational information.

At block 2170, spatial coordinates of the rotational vector in the three-dimensional rotational coordinate system may be acquired based on the pose of the three-dimensional rotational coordinate system.

In some implementations, as the three-dimensional rotational coordinate system may be generated based on the interaction device, the pose of the three-dimensional rotational coordinate system may be changed as the interaction device rotates. The terminal device may determine the pose of the three-dimensional rotational coordinate system based on the rotational information of the interaction device to further determine an angle between the rotational vector and each axis of the three-dimensional rotational coordinate system, such that the spatial coordinates of the rotational vector in the three-dimensional rotational coordinate system may be acquired. The spatial coordinates may indicate a position of the rotational vector and a direction indicated by the rotational vector in the three-dimensional rotational coordinate system.

At block 2180, when the spatial coordinates of the rotational vector are located within the spatial region corresponding to any user interface element, the corresponded control operation may be performed based on the user interface element corresponding to the spatial region.

In some implementations, the terminal device may determine whether the spatial coordinates of the rotational vector are located within the spatial region corresponding to any user interface element in the three-dimensional rotational coordinate system. When the spatial coordinates of the rotational vector are located within the spatial region corresponding to any user interface element in the three-dimensional rotational coordinate system, the corresponded control operation may be performed based on the user interface element corresponding to the spatial region.

Figure 25:
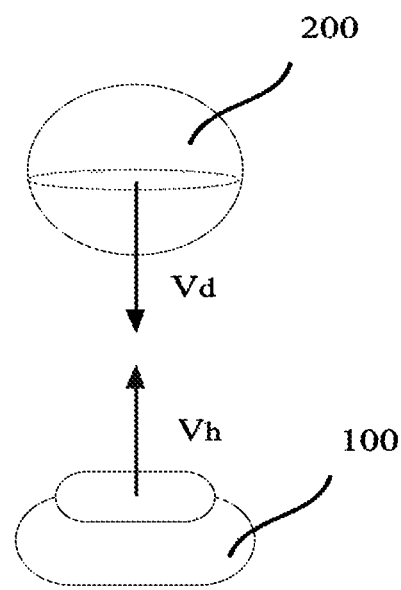
FIG. 25 is a view of a rotational vector according to an embodiment of the present disclosure.

As shown in FIG. 23 and FIG. 25, taking the three-dimensional rotational coordinate system in FIG. 23 as an example, the rotational vector may be Vd, and a direction indicated by Vd may be reversed from a direction indicated by a first vector Vh. A spatial region T as shown in FIG. 23 may be a spatial region corresponding to a user interface element at which the rotational vector Vd is located. As the direction indicated by the rotational vector is fixed in the spatial coordinate system of the virtual space taking the terminal device as the origin, when the interaction device is rotated, the spatial coordinates of the rotational vector in the three-dimensional rotational coordinate system may also be changed. When the pose of the interaction device is changed, the spatial region corresponding to the user interface element in the three-dimensional rotational coordinate system may not be changed, and therefore, the rotational vector may be determined to be located within the spatial region corresponding to which user interface element in the three-dimensional rotational coordinate system, and the corresponded control operation may be performed based on the user interface element.

In some implementations, the one or more user interface elements may be arranged into a single row or a single column. As the plane at which the one or more user interface elements are arranged may be divided into various planar regions in the three-dimensional rotational coordinate system, a projection of the rotational vector onto the plane at which the one or more user interface elements are arranged may need to be considered only. In such a way, when the user is operating the interaction device, only one degree of freedom (DOF) of the rotational information of the interaction device may need to be considered, reducing a possibility of a faulty operation.

Figure 26A:
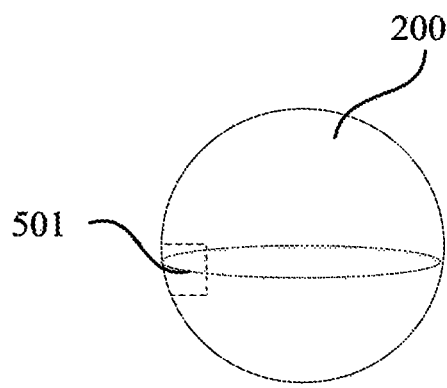
FIGS. 26a and 26b are views of display effects according to an embodiment of the present disclosure.
Figure 26B:
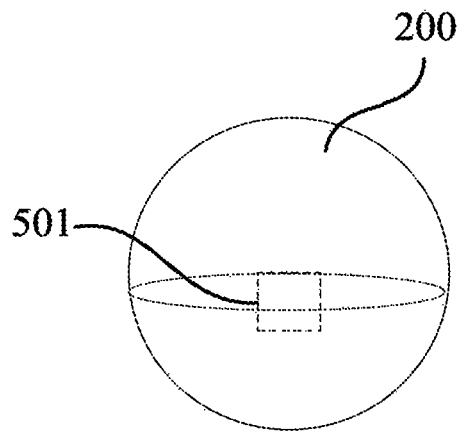

In some implementations, the superimposing position of the user interface element in the virtual image may be changed along with the change of the position and pose of the interaction device, such that, after the user rotates the interaction device, the user interface element may not be observed by the user. For example, the displayed user interface element may be shielded by the interaction device or may appear on a face of the interaction device opposing to the terminal device. The terminal device may adjust the user interface element in the virtual image. As an implementation, when the spatial coordinates of the rotational vector is located with a predefined spatial region, the spatial region corresponding to each user interface element in the three-dimensional rotational coordinate system may be adjusted. The superimposing position of the user interface element in the real space after the adjustment may face the terminal device directly. The predefined spatial region may be at least one of a spatial region out of a boundary of the spatial region corresponding to the user interface element and a spatial region opposing to the spatial region corresponding to the user interface element. When the spatial coordinates of the rotational vector is located within the predefined spatial region, the user interface element may be located out of the visual range or located on the face of the interaction device opposing to the terminal device. After the user interface element is adjusted, the superimposing position of the user interface element in the real space may face the terminal device directly, such that the user interface element may appear within the visual range again and may be observed by the user, and the user may be able to check the user interface element and perform the selection. As shown in FIG. 26a and FIG. 26b, the user interface element 501 in FIG. 26a is about to leave the visual range. After the user interface element 501 is adjusted, the user interface element 501 may appear at a position facing the terminal device directly again, such that the user may observe the user interface element 501 at a central region.

In one implementation, the terminal device may generate feedback information to alert the user that the position of the user interface element may be adjusted.

The user may rotate the interaction device, and interaction with various user interface elements may be achieved. Simplified the user's operations may be provided and the interactivity may be improved.

In some implementations, when the spatial position of the rotational vector is within the position region corresponding to any user interface element in the virtual space, the feedback information may be generated to alert the user that the user interface element is in the state of being selected, such that the user may determine whether to perform the corresponded control operation based on the user interface element.

As an implementation, the terminal device may generate a virtual alerting box, and a form of the virtual alerting box may not be limited by the present disclosure, for example, the virtual alerting box may be displayed in a certain color. As another implementation, the terminal device may generate a sound, such as a sound of vibration, to alert the user that the user interface element is in the state of being selected. As still another implementation, the terminal device may control a color or a size of the user interface element to change, such as changing the color of the user interface element into a certain color, increasing the size of the user interface element, or the like.

In some implementations, when the user interface element corresponding to the spatial region at which the rotational vector is located is changed, the feedback information may also be generated to alert the user.

In some implementations, the corresponded control operation performed based on user interface element corresponding to the position region may be determined by setting. For example, the corresponded control operation may be determined by acquiring a determination instruction. Alternatively, when duration for which the rotational vector is located within the position region is longer than a predefined duration, the corresponded control operation may be determined.

In some implementations, a button may be arranged, and when a pressing is detected as being performed to the button, the terminal device may acquire the determination instruction. Alternatively, when a pressing is detected as being performed to the button, the terminal device may receive the determination instruction sent from the interaction device.

In some implementations, the terminal device may perform various operations based on detection of the pressing operation performed to various buttons, the number of times that the button is pressed, or a force of the pressing operation. For example, when the pressing operation is detected as being performed to a first button, the user interface element may be moved to a first position. When the pressing operation is detected as being performed to a second button, the user interface element may be moved to a second position. When the number of times that the button is pressed is detected to be 1, the size of the user interface element may be increased to be a first value. When the number of times that the button is pressed is detected to be 2, the size of the user interface element may be increased to be a second value. The second value may be greater than the first value.

In some implementations, the terminal device may acquire one or more user interface elements in a lower level corresponding to the user interface element in the position region, divide the three-dimensional rotational coordinate system again based on the one or more user interface elements in the lower level. In the present implementation, a level jump among various user interface elements of multiple levels may be achieved, and after the jumping, the one or more user interface elements in the lower level may correspond to the spatial region of the three-dimensional rotational coordinate system, such that subsequent interaction with the one or more user interface elements in the lower level may be achieved.

In some implementations, the terminal device may acquire one or more user interface elements in the lower level corresponding to the user interface element in the position region, the divided various spatial regions of the three-dimensional rotational coordinate system may correspond to the one or more user interface elements in the lower level, and the one or more user interface elements in the lower level may be displayed.

Figure 27A:
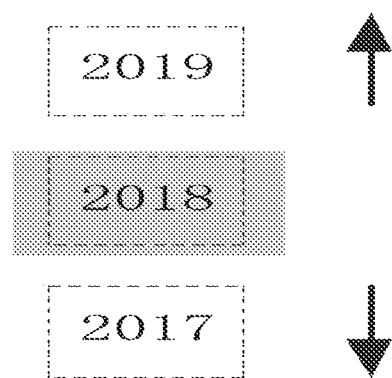
FIGS. 27a and 27b are views of display effects according to another embodiment of the present disclosure.

In one scenario, the one or more user interface elements may be arranged into a single row or a single column. When a relatively large number of the user interface elements are available, the interaction device may be rotated horizontally or vertically to achieve the selection of various user interface elements. As shown in FIG. 27a, in a scenario of selecting a date, various years may be displayed in a column, the interaction device may be rotated vertically to achieve the selection of a certain year.

Figure 27B:
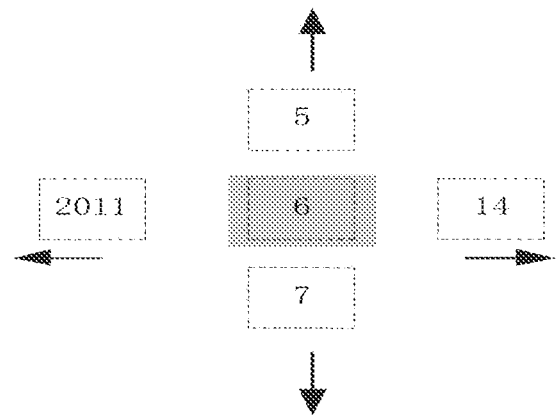

In one scenario, the one or more user interface elements may be arranged into multiple rows with multiple columns. When a relatively large number of user interface elements are available, the interaction device may be rotated horizontally and vertically to achieve the selection for various user interface elements. As shown in FIG. 27b, in a scenario of selecting a date, each column may correspond to each of year, month, and day. Initially, the spatial position of the rotation vector may be located within the spatial region corresponding to any year. The interaction device may be rotated vertically to select a certain year. The interaction device may subsequently be rotated horizontally to allow the spatial position of the rotational vector to be located within the spatial region corresponding to any month, and the interaction device may subsequently be rotated vertically to select a certain month. After the interaction device is rotated horizontally or vertically, when the spatial position of the rotational vector is located within the spatial region of an end of a row or within the spatial region of an end of a column, the terminal device may generate the feedback information to alert the user. The present disclosure does not limit the form of the feedback information, such as a slow rebound, a display of gradient colors, a display of a corresponded pattern, and the like.

In some scenarios, the one or more user interface elements may be arranged randomly. The interaction device may be rotated along any direction to achieve the selection of various user interface elements. For example, when the interaction device is a sphere, the displayed virtual image may be a model of Earth. The various user interface elements may indicate various countries. The interaction device may be rotated to allow the spatial position of the rotational vector to be located within the spatial region corresponding to options of the various counties, such that the selection may be performed to the options of the various countries.

According to the above-mentioned method of controlling the virtual image, the three-dimensional rotational coordinate system may be divided into various spatial regions based on various arrangements of the one or more user interface elements. The user may interact with the one or more user interface elements by rotation operations, providing an easy operation.

In one embodiment, a computer-readable non-transitory storage medium may be provided. The computer-readable non-transitory storage medium may have a program code stored in, and the program code may be executed by a processor to perform the method as described in the above embodiments.

The computer-readable non-transitory storage medium 800 may be an electronic memory, such as a flash memory, an Electrically Erasable Programmable Read Only Memory (EEPROM), an Erasable Programmable Read Only Memory (EPROM), a hard disc, a Read-Only Memory (ROM), or the like. Alternatively, computer-readable non-transitory storage medium 800 may include a nonvolatile computer readable medium. The computer-readable non-transitory storage medium 800 may have a storage space to store a program code 810, wherein the program code 810 may allow execution of any method and block of the above-described methods. The program code may be read from one or more computer program products, or may be written into the one or more computer program products. The program code 810 may be compressed by appropriate means.

What is claimed is:

1. A system for controlling a virtual image, comprising:
    an interaction device, comprising at least two faces arranged on different planes; and
    a terminal device, comprising a processor and a non-transitory memory, wherein the non-transitory memory stores at least one program, the at least one program is configured to be executed by the processor to perform actions of:
    establishing a three-dimensional rotational coordinate system corresponding to the interaction device by taking a predefined point of the interaction device as an origin;
    acquiring a spatial arrangement of at least one interface element comprised by the virtual image;
    determining the spatial arrangement to be an arrangement in grid;
    dividing the three-dimensional rotational coordinate system into spatial regions based on multiple rows with multiple columns, to determine, based on an arrangement position of the at least one user interface element, the spatial region corresponding to each user interface element in the three-dimensional rotational coordinate system, wherein each user interface element corresponds to one spatial region;
    acquiring a relative spatial position between the terminal device and the interaction device;
    generating the virtual image based on the relative spatial position, wherein a superimposing position of each user interface element in a real space corresponds to one of the at least two faces of the interaction device;
    acquiring a pre-generated rotational vector corresponding to the interaction device;
    determining a spatial position of the rotational vector in a virtual space based on the relative spatial position, wherein a direction indicated by the rotational vector is fixed; and
    performing a control operation of one user interface element under a condition of the spatial position of the rotational vector being within a position region corresponding to the user interface element in the virtual space.

2. The system of claim 1, wherein
    the determining the spatial position of the rotational vector in the virtual space comprises:
    acquiring rotational information of the interaction device based on the relative spatial position;
    determining pose of the three-dimensional rotational coordinate system based on the rotational information; and
    calculating spatial coordinates of the rotational vector in the three-dimensional rotational coordinate system based on the pose of the three-dimensional rotational coordinate system; and
    the performing the control operation of one user interface element comprises:
    performing the control operation of one user interface element, under the condition of the spatial coordinates of the rotational vector being within the spatial region corresponding to the user interface element.

3. The system of claim 2, wherein the at least one program is further configured to be executed by the processor to perform actions of:
    adjusting the spatial region corresponding to each user interface element in the three-dimensional rotational coordinate system under a condition of the spatial coordinates of the rotational vector being within a predefined spatial region; and
    controlling the superimposing position of the adjusted user interface element in the real space to face the terminal device directly, wherein the predefined spatial region comprises at least one of a first spatial region and a second spatial region, wherein the first spatial region is a spatial region out of a boundary of the spatial region corresponding to the user interface element, and the second spatial region is a spatial region opposing to the spatial region corresponding to the user interface element.

4. The system according to claim 1, wherein the performing the control operation of one user interface element comprises:
    acquiring at least one user interface element at a lower level corresponding to the user interface element at a parent level of the lower level at the position region;
    re-dividing the three-dimensional rotational coordinate system into various spatial regions based on the at least one user interface element at the lower level; and
    determining the spatial region corresponding to the at least one user interface element at the lower level in the three-dimensional rotational coordinate system.

5. The system of claim 1, wherein the performing the control operation of one user interface element comprises:
    receiving a determination instruction; and
    performing the control operation of the user interface element in response to the determination instruction.

6. The system of claim 1, wherein the performing the control operation of one user interface element comprises:
    calculating a duration of the spatial position of the rotational vector being within the position region; and
    performing the control operation of the user interface element under a condition of the duration being greater than a predefined duration.

7. The system of claim 1, wherein the at least one program is further configured to be executed by the processor to perform actions of:
generating feedback information, wherein the feedback information is configured to alert that the user interface element corresponding to the position region is in the state of being selected.

8. The system of claim 1, wherein the generating the virtual image based on the relative spatial position comprises:
determining the number of user interface elements to be displayed;
selecting a predefined threshold number of the user interface elements to be displayed, under a condition of the number of the user interface elements being greater than a predefined threshold;
generating the virtual image based on the relative spatial position, wherein the virtual image includes the selected predefined threshold number of the user interface elements;
receiving a switching instruction; and
switching the user interface elements included in the virtual image into other user interface elements based on the switching instruction, wherein the other user interface elements are unselected from the user interface elements to be displayed.

9. A method of controlling a virtual image, comprising:
acquiring a relative spatial position between a terminal device and an interaction device;
generating the virtual image based on the relative spatial position, wherein the virtual image comprises a user interface element, and a superimposing position of the user interface element in a real space corresponds to the interaction device;
acquiring a pre-generated rotational vector corresponding to the interaction device;
determining a spatial position of the rotational vector in a virtual space based on the relative spatial position, wherein a direction indicated by the rotational vector is fixed;
calculating a duration of the spatial position of the rotational vector being within a position region corresponding to the user interface element in the virtual space, under a condition of the spatial position of the rotational vector being within the position region; and
performing a control operation of the user interface element, under a condition of the duration being greater than a predefined duration.

10. The method of claim 9, prior to the acquiring relative spatial position between the terminal device and the interaction device, further comprising:
establishing a three-dimensional rotational coordinate system corresponding to the interaction device taking a predefined point of the interaction device as an origin;
dividing the three-dimensional rotational coordinate system into various spatial regions based on the user interface element, wherein at least one user interface element is arranged; and
determining a spatial region corresponding to the user interface element in the three-dimensional rotational coordinate system, wherein at least one user interface element is arranged, and each user interface element corresponds to one spatial region.

11. The method of claim 10, wherein
the determining the spatial position of the rotational vector in the virtual space comprises:

acquiring rotational information of the interaction device based on the relative spatial position;
determining pose of the three-dimensional rotational coordinate system based on the rotational information; and
calculating spatial coordinates of the rotational vector in the three-dimensional rotational coordinate system based on the pose of the three-dimensional rotational coordinate system; and
the performing the control operation of the user interface element comprises:
performing the control operation of one user interface element, under the condition of the spatial coordinates of the rotational vector being within the spatial region corresponding to the user interface element.

12. The method of claim 11, further comprising:
adjusting the spatial region corresponding to the user interface element in the three-dimensional rotational coordinate system under a condition of the spatial coordinates of the rotational vector being within a predefined spatial region; and
controlling the superimposing position of the adjusted user interface element in the real space to face the terminal device directly, wherein the predefined spatial region comprises at least one of a first spatial region and a second spatial region, wherein the first spatial region is a spatial region out of a boundary of the spatial region corresponding to the user interface element, and the second spatial region is a spatial region opposing to the spatial region corresponding to the user interface element.

13. The method according to claim 9, wherein the performing the control operation of the user interface element comprises:
acquiring at least one user interface element at a lower level corresponding to the user interface element at a parent level of the lower level at the position region; and
re-dividing the three-dimensional rotational coordinate system into various spatial regions based on the at least one user interface element at the lower level; and
determining the spatial region corresponding to the at least one user interface element at the lower level in the three-dimensional rotational coordinate system.

14. The method of claim 9, wherein the performing the control operation of the user interface element comprises:
receiving a determination instruction; and
performing the control operation of the user interface element in response to the determination instruction.

15. The method of claim 9, wherein the performing the control operation of the user interface element comprises:
calculating a duration of the spatial position of the rotational vector being within the position region; and
performing the control operation of the user interface element under a condition of the duration being greater than a predefined duration.

16. The method of claim 9, wherein the generating the virtual image based on the relative spatial position comprises:
determining the number of user interface elements to be displayed;
selecting a predefined threshold number of the user interface elements to be displayed, under a condition of the number of the user interface elements being greater than a predefined threshold;

generating the virtual image based on the relative spatial position, wherein the virtual image includes the selected predefined threshold number of the user interface elements;

receiving a switching instruction; and switching the user interface elements included in the virtual image into other user interface elements based on the switching instruction, wherein the other user interface elements are unselected from the user interface elements to be displayed.

17. A terminal device, comprising:

at least one processor;

a non-transitory memory, having at least one computer program stored therein, wherein the at least one computer program is arranged to be executed by the at least one processor, such that the at least one processor is arranged to perform actions of:

acquiring a relative spatial position between a terminal device and an interaction device;

determining the number of user interface elements to be displayed;

selecting a predefined threshold number of the user interface elements to be displayed, under a condition of the number of the user interface elements being greater than a predefined threshold;

generating the virtual image based on the relative spatial position, wherein the virtual image comprises the selected predefined threshold number of the user interface elements, and a superimposing position of each user interface element in a real space corresponds to the interaction device;

acquiring a pre-generated rotational vector corresponding to the interaction device;

determining a spatial position of the rotational vector in a virtual space based on the relative spatial position, wherein a direction indicated by the rotational vector is fixed; and performing a control operation of one user interface element under a condition of the spatial position of the rotational vector being within a position region corresponding to the user interface element in the virtual space, wherein the actions further comprise:

receiving a switching instruction; and switching the user interface elements included in the virtual image into other user interface elements based on the switching instruction, wherein the other user interface elements are unselected from the user interface elements to be displayed.

18. The terminal device of claim 17, wherein, prior to the acquiring relative spatial position between a terminal device and an interaction device, the at least one processor is further arranged to perform actions of:

establishing a three-dimensional rotational coordinate system corresponding to the interaction device taking a predefined point of the interaction device as an origin;

dividing the three-dimensional rotational coordinate system into various spatial regions based on the user interface elements; and determining a spatial region corresponding to each user interface element in the three-dimensional rotational coordinate system, and each of the user interface elements corresponds to one spatial region.

19. The terminal device of claim 18, wherein the determining a spatial position of the rotational vector in a virtual space based on the relative spatial position comprises:

acquiring rotational information of the interaction device based on the relative spatial position;

determining pose of the three-dimensional rotational coordinate system based on the rotational information; and the performing the control operation of one user interface element comprises:

performing the control operation of one user interface element, under the condition of the spatial coordinates of the rotational vector being within the spatial region corresponding to the user interface element.

20. The terminal device of claim 17, wherein the rotational vector is arranged to select virtual content;

a direction indicated by the rotational vector is fixed in a spatial coordinate system taking the terminal device as an origin; and the spatial position of the rotational vector is changed in correspondence with a pose change of the interaction device in a spatial coordinate system taking the interaction device as an origin.

* * * * *